(12) United States Patent
Janiszeski et al.

(10) Patent No.: US 9,064,284 B1
(45) Date of Patent: Jun. 23, 2015

(54) SYSTEM AND METHOD OF PROVIDING A FINANCIAL INVESTMENT RECOMMENDATION USING A PORTFOLIO PLANNER

(75) Inventors: Norbert Janiszeski, San Antonio, TX (US); Laif Wheeler, Helotes, TX (US); Laurie Jimenez, San Antonio, TX (US); Nancy Shutt, Bulverde, TX (US); Alan Sell, Boerne, TX (US); Ralph J. Smith, San Antonio, TX (US); Ivan G. Quan, San Antonio, TX (US); David Hirner, San Antonio, TX (US); Leslie Tomlinson, Helotes, TX (US); Andrew Dempsey, San Antonio, TX (US); Bruce Wilks, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1357 days.

(21) Appl. No.: 11/904,436

(22) Filed: Sep. 27, 2007

(51) Int. Cl.
*G06Q 40/00* (2012.01)
*G06Q 40/04* (2012.01)
*G06Q 40/06* (2012.01)

(52) U.S. Cl.
CPC ............... *G06Q 40/04* (2013.01); *G06Q 40/06* (2013.01); *G06Q 40/00* (2013.01)

(58) Field of Classification Search
CPC ....... G06Q 40/06; G06Q 40/00; G06Q 40/02; G06Q 40/08; G06Q 17/243; G06Q 17/30855; G06Q 17/30893; G06Q 20/10; G06Q 30/0601; G06Q 40/025; G06Q 40/10; G06Q 30/06; G06Q 30/08; G06Q 20/02; G06Q 10/02; G06Q 10/063; G06Q 10/067; G06Q 10/087; G06Q 10/10; G06Q 20/04; G06Q 20/12; G06Q 30/04; G06Q 30/0603; G06Q 30/0629; G06Q 30/0641; G06Q 50/16
USPC ........... 705/1, 4, 26, 28, 35, 36, 36 R, 37, 38, 705/39; 709/203; 345/745
See application file for complete search history.

(56) References Cited

U.S. PATENT DOCUMENTS

| | | | |
|---|---|---|---|
| 4,334,270 A | 6/1982 | Towers | 364/300 |
| 4,751,640 A | 6/1988 | Lucas | 364/408 |
| 5,126,936 A | 6/1992 | Champion | 364/408 |
| 5,852,811 A | 12/1998 | Atkins | 705/36 |
| 6,012,043 A * | 1/2000 | Albright et al. | 705/36 R |
| 6,018,722 A * | 1/2000 | Ray et al. | 705/36 R |
| 7,120,601 B2 * | 10/2006 | Chen et al. | 705/36 R |
| 7,149,713 B2 * | 12/2006 | Bove et al. | 705/36 R |
| 2002/0023051 A1 * | 2/2002 | Kunzle et al. | 705/38 |
| 2002/0107770 A1 * | 8/2002 | Meyer et al. | 705/36 |
| 2002/0147672 A1 * | 10/2002 | Gaini | 705/36 |

(Continued)

*Primary Examiner* — James Trammell
*Assistant Examiner* — Sanjeev Malhotra
(74) *Attorney, Agent, or Firm* — Brinks Gilson & Lione

(57) ABSTRACT

A method, a system and a computer-readable medium for generating a financial investment recommendation plan to a customer is described. A financial questionnaire is provided to a customer and is completed by the customer or a customer service representative assisting the customer, and the questionnaire has several options available to the customer, to include selecting an option to indicate that a tax-advantaged recommendation is desired to minimize taxes owed. The customer enters financial asset information and receives a recommendation with product-level detail on specific financial products to invest in, along with an action plan to assist the customer with investing in the financial products suggested in the recommendation.

21 Claims, 15 Drawing Sheets

(56) References Cited

U.S. PATENT DOCUMENTS

| | | | |
|---|---|---|---|
| 2002/0154162 A1* | 10/2002 | Bhatia et al. ............... 345/745 |
| 2002/0156846 A1* | 10/2002 | Rawat et al. ................ 709/203 |
| 2002/0188536 A1* | 12/2002 | Milosavljevic et al. ........ 705/35 |
| 2002/0198809 A1* | 12/2002 | Daley et al. .................... 705/36 |
| 2003/0028466 A1* | 2/2003 | Jenson et al. ................... 705/36 |
| 2003/0115150 A1 | 6/2003 | Hamilton |
| 2003/0135457 A1* | 7/2003 | Stewart et al. ................. 705/39 |
| 2003/0200171 A1* | 10/2003 | Kochansky ..................... 705/39 |
| 2003/0225663 A1* | 12/2003 | Horan et al. .................... 705/36 |
| 2003/0236728 A1* | 12/2003 | Sunderji et al. ................ 705/35 |
| 2004/0098323 A1* | 5/2004 | Bowser ........................... 705/35 |
| 2004/0167824 A1* | 8/2004 | Singh et al. .................... 705/26 |
| 2004/0236673 A1 | 11/2004 | Eder |
| 2005/0027632 A1* | 2/2005 | Zeitoun et al. .................. 705/36 |
| 2005/0060162 A1* | 3/2005 | Mohit et al. ...................... 705/1 |
| 2005/0187801 A1* | 8/2005 | Phelps .............................. 705/4 |
| 2005/0187802 A1* | 8/2005 | Koeppel ........................... 705/4 |
| 2005/0222930 A1* | 10/2005 | Graff .............................. 705/35 |
| 2006/0085316 A1* | 4/2006 | Doire et al. .................... 705/35 |
| 2006/0095351 A1* | 5/2006 | Gershenfeld et al. ........... 705/35 |
| 2006/0293990 A1* | 12/2006 | Schaub ........................... 705/35 |
| 2007/0055585 A1* | 3/2007 | Agrawal et al. ................ 705/28 |
| 2007/0055602 A1* | 3/2007 | Mohn ........................ 705/36 R |
| 2007/0100731 A1* | 5/2007 | Ward et al. ..................... 705/37 |
| 2007/0208645 A1* | 9/2007 | Hoffman et al. ............ 705/36 R |
| 2008/0077519 A1* | 3/2008 | Pedersen et al. ............ 705/36 R |
| 2008/0086424 A1 | 4/2008 | Jambunathan |
| 2010/0059587 A1 | 3/2010 | Miller |

\* cited by examiner

SYSTEM AND METHOD OF PROVIDING A FINANCIAL INVESTMENT RECOMMENDATION USING A PORTFOLIO PLANNER

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2007.

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 11/904,349, U.S. patent application Ser. No. 11/904,343, U.S. patent application Ser. No. 11/904,342, U.S. patent application Ser. No. 11/904,438, U.S. patent application Ser. No. 11/904,592, and U.S. patent application Ser. No. 11/904,344, each filed on Sep. 27, 2007 and each entitled "SYSTEM AND METHOD OF PROVIDING A FINANCIAL INVESTMENT RECOMMENDATION USING A PORTFOLIO PLANNER."

BACKGROUND

The present invention generally relates to financial planning. More particularly, the present invention relates to system and methods to provide portfolio planning that is adjusted based upon the specific needs of the customer As individuals work longer hours, many people want a higher quality of life, including the ability to send their children to college, or simply to retire early. In order to achieve such goals, some people feel that investing a portion of their earnings is critical.

In order to maximize returns and minimize risk while investing, the expertise of a financial planner is often solicited. Before investing, the customer may decide what they are planning for, how long they plan to invest, how sensitive they are to the risk of losing part of their investment in an unfavorable market, how much they have saved or invested currently, et cetera. Many companies exist that provide financial planning assistance regarding mutual funds, stocks, brokerage accounts, etc. Among companies that provide financial planning assistance, one common occurrence is that these companies provide much generalized investment information, i.e. asset specific information—stocks, bonds, and cash. They fail to tell the customer specific products that they should invest in, e.g. Capital Growth Fund, S&P Index Fund, etc.

This generalized investment information is typically not beneficial to the customer because the customer does not know how to act on it. Oftentimes the customer is more confused after a recommendation is provided than they were before they solicited the financial planning assistance. As a result, they have to make multiple visits to the planner before taking action on the recommendations provided. Many who do act on the recommendations provided often do so without completely understanding what products they are investing in.

In order to clear up some of the confusion behind investment recommendation plans and to demystify recommendation plans for the investor with little investment knowledge, an investment recommendation providing product level information for each product recommended to the customer is provided.

SUMMARY

An investment recommendation is provided to the customer containing product level detail. In one exemplary and non-limiting example, the method is started from generating a recommendation plan to a customer. The financial institution provides a customer a questionnaire that requests customer asset information, and then receiving the completed questionnaire from the customer to obtain the customer asset information. Then providing a recommendation for a product at a specific product-level detail, and providing an action plan that assists the customer in investing in a product from the recommendation.

In a second exemplary and non-limiting example is receiving an investment recommendation, where the customer completes a questionnaire, enters and reviews financial assets; receives a recommendation that provides product level detail on a product to invest in; and receives an action plan to assist a customer with investing in the product suggested by the recommendation. In a third exemplary and non-limiting example is receiving an investment recommendation where the questionnaire is completed by a customer service representative assisted by a customer. The same steps are followed as in the second exemplary and non-limiting example in order to receive an investment recommendation.

In a fourth exemplary and non-limiting example is updating an investment recommendation where a questionnaire is completed; financial assets are entered and reviewed; a recommendation is received; a customer service representative changes a default amount of a product recommended to a customer within an approved range; and a principal review of the recommendation is triggered if the default percentage entered by the customer service representative is outside of that approved range.

In another exemplary and non-limiting example is providing investment safeguards where the customer is provided a recommendation plan containing product level detail wherein the customer is informed of a product to invest in; and a customer service representative is provided with a device to change a default amount of the product recommended to the customer within an approved range.

In another exemplary and non-limiting example is implementing a recommendation plan. This is accomplished permitting a user to enter a total investment amount which is then evaluated in one of two ways depending upon the amount entered. The type of recommendation desired, the customer's tax bracket and risk tolerance level are evaluated. An investment strategic model selected from all the data obtained and a recommendation is provided.

In another exemplary and non-limiting example an action plan is provided. The customer is provided with an investment recommendation and an action plan to assist the customer with implementing the investment recommendation. The eighth exemplary and non-limiting example is implementing said action plan.

In another exemplary and non-limiting example is integrating on-line fulfillment systems with a recommendation. Here, information regarding a product is integrated from a recommendation to a product fulfillment system; and the customer may invest in a product from the product fulfillment system.

In another exemplary and non-limiting example is receiving an investment recommendation that is tax-advantaged. This example is like the other examples mentioned above that deal with a customer receiving an investment with the exception of the customer or the customer service representative assisted by the customer designates that a tax-advantaged recommendation is desired to minimize the taxes owed.

The present invention is therefore advantageous in that it provides a method to mitigate confusion from investment recommendation plans for an otherwise financially unknowledgeable investor thorough using a questionnaire. The system and method can include using a customer service representative to assist in gathering the requisite information from the customer should the questionnaire provide insufficient.

DETAILED DESCRIPTION OF ILLUSTRATIVE EMBODIMENTS

Figure 1:
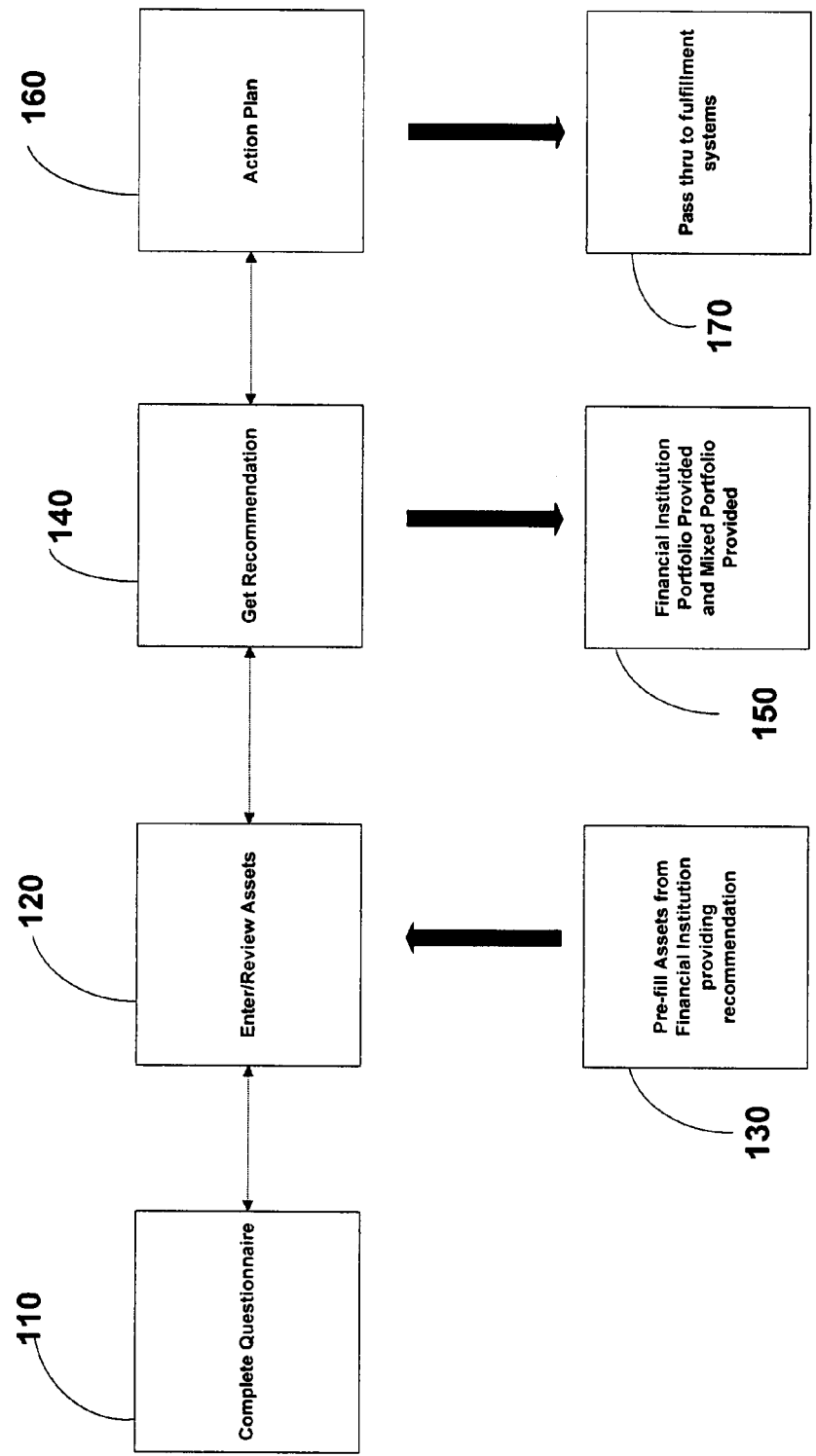
FIG. 1 is a graphical representation of an overview of the methodology of getting a recommendation from the portfolio planner.

FIG. 1 shows an overview of the methodology of getting a recommendation from the portfolio planner. The customer is provided with a questionnaire 110 that is used by the portfolio planner to extract information from the customer that is used to generate the recommendation. Once the questionnaire is completed, the customer will be allowed to enter and review information about his financial assets 120. Any assets housed by the financial institution providing the recommendation will be pre-filled 130 or automatically filled into the portfolio planner. Next the customer gets the recommendation 140 generated from the information provided to the portfolio planner. The recommendation 140 provides the customer with two portfolios 150—a financial institution portfolio and a mixed portfolio. The customer then decides which option that he wants to invest in, which takes him to the action plan 160. From the action plan 160, the customer may decide whether he will (1) buy or exchange recommended funds using an existing mutual account from the financial institution providing the recommendation or (2) initiate a transfer of investments from a brokerage account at another financial institution. The customer is taken from the recommendation plan into the necessary product fulfillment systems 170 through the use of smart links where he can take the necessary action(s) in order to purchase the investment products suggested by the recommendation. The portfolio planner provides the customer with investment recommendations through the formulation of an investment portfolio recommendation that includes product level details. The recommendation is accessible by either the customer or by a customer service representative ("CSR") who is assisting a customer.

Figure 2:
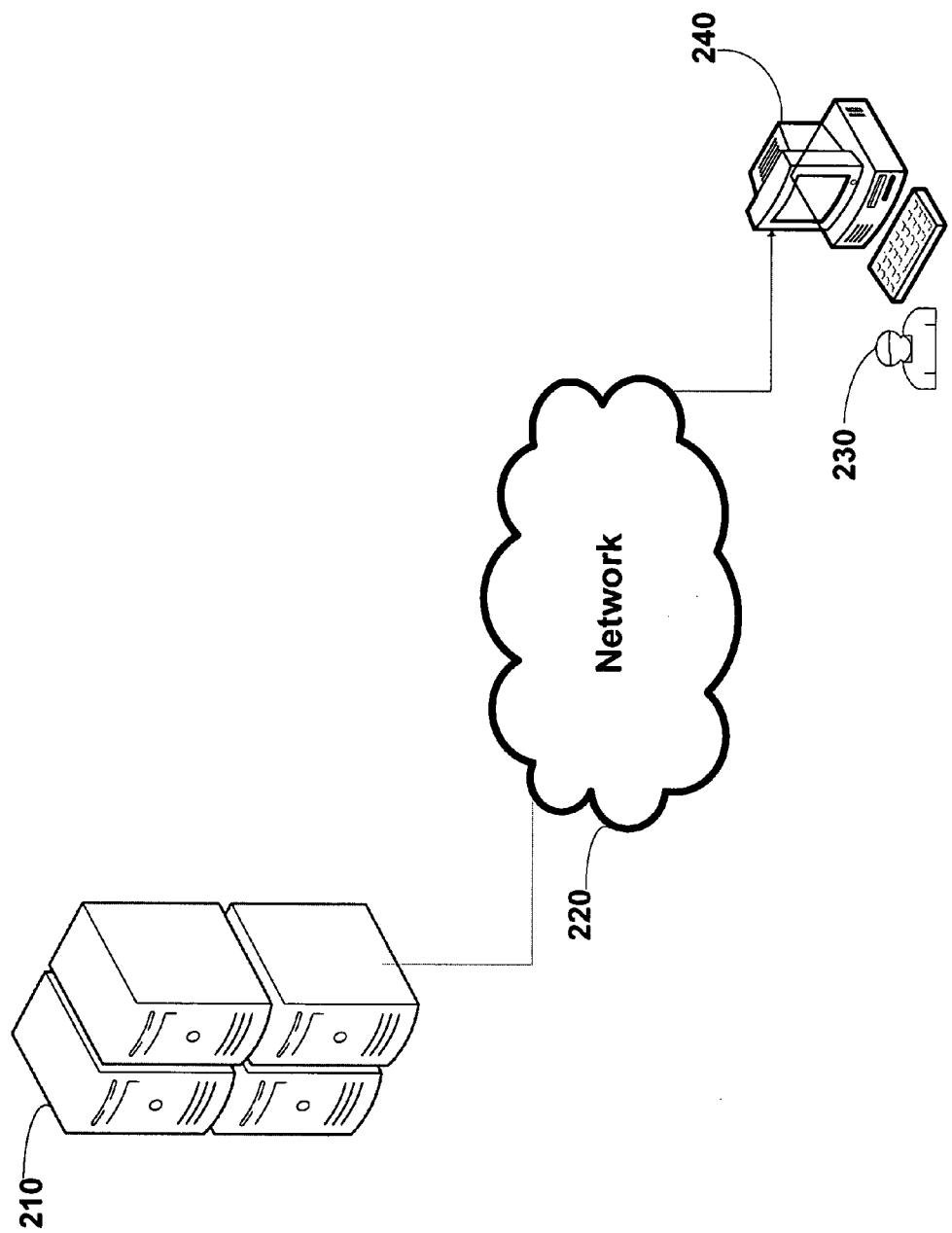
FIG. 2 is a graphical representation of a customer using a personal computer to connect to the financial institution to access the portfolio planner.

The customer version of the portfolio planner shown in FIG. 2 is for the customer who is very independent, computer savvy, or who simply does not want to use a CSR for their financial planning. When a customer 230 accesses the portfolio planner, he most often does so using his personal computer 240, either at home or at work, that is connected to a network 220. The network is connected to the financial institution's network server 210. The customer commonly accesses the financial institution's network server through the Internet. The customer version of the portfolio planner shown in FIG. 3. The planner is available via the financial institution's website. Once the customer accesses the link to the planner, the customer is informed of the information that he will need, i.e. taxable income, amount of net worth, or details about current investments, in order for the illustrative embodiment to formulate a recommendation for his investment portfolio. Links are provided to define taxable income or net worth and a risk tolerance bar graph is provided to assist the customer in determining his level of investment risk. Once the customer begins the process, he is taken through a series of screens related to, but not limited, to financial information, financial objectives, and investment assets, where he is asked a series of questions, i.e. what is your investing goal, taxable income, and whether you are making tax-advantaged or taxable investments. Depending upon whether the customer is making tax-advantaged or taxable investments, the portfolio planner recommendations will vary. The differences between these recommendations will follow.

The screen view showing assets is broken down into investments held outside the financial institution providing the recommendation 310 and into investments held at the financial institution 330. The planner automatically pre-fills the information regarding the investments held at the financial institution providing the recommendation. However, the customer is allowed to uncheck any investment listed on this screen that he does not want included in his recommendation 320. In the section for investments held outside the financial institution 310, the customer will be provided with a list of categories of investments that he may own. The customer is prompted to enter additional details on each type of investment based on the category of investment (account type, investment type, a description of the asset or asset the category of investment (account type, investment type, a description of the asset or asset detail, the asset class and market value). The customer is allowed to verify all of the information that has been entered or pre-filled, located in the section 330, Investments Held At Financial Institution, before he submits it for the recommendation. If any of the information is incorrect, he may change or edit the information before he submits it for the recommendation. Once all of the information has been verified, the customer may submit the information by pressing the "Get Recommendation" button 340.

Figure 4:
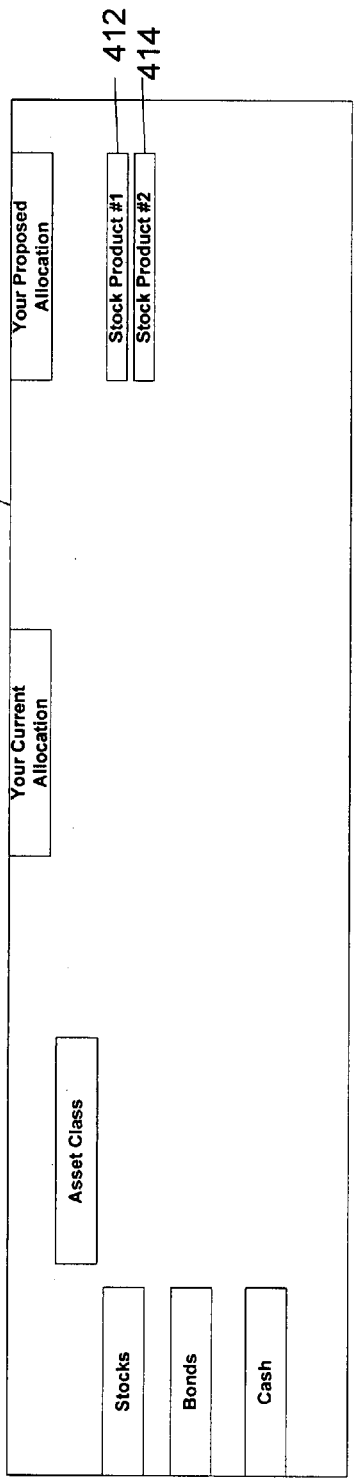
FIG. 4 is a graphical representation of the customer's screen view of the recommendation plan.
Figure 4:
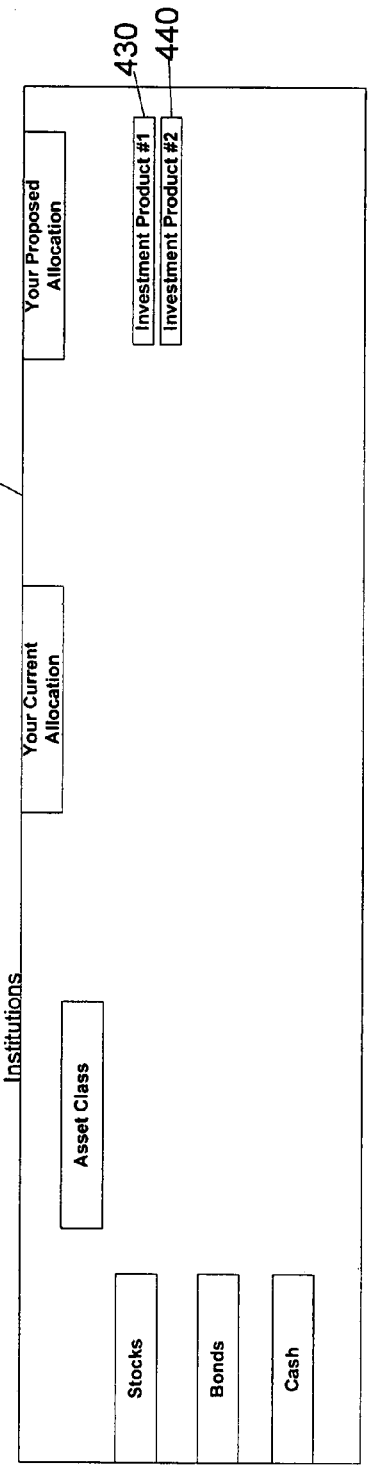

Shortly after the "Get Recommendation" button is pressed, the customer's recommendation is provided, as illustrated in FIG. 4, and the customer and the CSR may now review the same web page of the portfolio recommendation simultaneously in real-time. The customer is given a recommendation containing a portfolio with only investments housed with the financial institution 410 and a portfolio including both investments housed within the financial institution and investments housed with other financial institutions or, in other words, a mixed portfolio 420. The customer can choose between investing in either option—the portfolio specific to the financial institution providing the recommendation 410 or the mixed portfolio 420, by clicking on the applicable button, "Invest in Option 1," noted by 416, and "Invest in Option 2," noted by 450. Both the financial portfolios contain proposed allocations including product level detail within each assets class (for example, global stocks, large cap value stocks, fixed income long bonds, fixed income intermediate, cash/cash equivalents, etc.) provided in the recommendation as shown by 412, 414, 430, and 440. The financial recommendation provided gives an unprecedented level of detail that is not historically provided by other financial planning tools. To explain, the action plan provided tells the customer what products he should invest in for each asset class including the applicable proposed allocation percentage and allocation dollar amount. Unlike other investment recommendation tools, the instant recommendation plan simplifies the financial planning process for the customer. For instance, in other recommendation tools, it is common for the customer to be told that he should invest in a specific asset class. However, he is not told the particular products in a specific asset class that he should invest in. Using other tools, the customer must take his recommendation to a financial planner to learn about specific products in which he can invest. Conversely, using the instant portfolio planner, the customer has all the information he needs in one place to implement his recommendation plan. He does not need to go to a financial planner to learn which specific investment products will most likely help him to achieve his financial goals. The instant application streamlines the investment process for the customer making it more likely that he will follow-through with making the investments that the recommendation provides.

The recommendation plan provides a level of detail that is product-based, rather than being only asset-class-based. Additionally, instead of recommending only mutual funds, the recommendation provided may suggest that the customer purchase products such as certificates of deposit (CDs), annuities, indexed savings accounts. The recommendation increases or decreases equity (stock) holdings at the asset class level. As previously taught, the recommendation provided herein tells the customer exactly what products he should invest in for each asset class including the applicable proposed allocation percentage and the allocation dollar amount. Unlike the CSR, the customer cannot change the proposed allocation percentage and dollar amounts for the products provided in the recommendation. However, the customer is allowed to see how the proposed allocations recommended compared to his current investment allocations. The amount of diversification provided in the recommendation is based upon the total dollar amount the customer wishes to invest, risk tolerance indicated by the customer and the duration of investment.

In order to take action on the portfolio recommendation, the customer is allowed to either buy, sell and/or exchange recommended funds located at the current financial institution by using an existing mutual fund account. Alternatively, he may initiate a transfer of investments from an investment account at another financial institution to an investment account at the financial institution providing the recommendation by clicking on a link that provides a transfer form and by completing the transfer form provided. If the customer chooses to place a trade, he then chooses an account based on the recommendation from which he wants to buy and/or exchange assets. After the customer chooses the account from which he will make his trade, he is then able to see any and all mutual funds falling under that account. He may then select the option to place a trade which pre-fills all the information needed to buy and/or exchange this asset into the applicable fulfillment system. The customer may proceed with buying or exchanging the respective asset. Once the transaction is complete, the system takes the customer back to the action plan where he may conduct another transaction. At any time during this process, the customer may contact a customer service representative, if he needs assistance.

The CSR version of the portfolio planner is slightly different from the customer version of the portfolio planner described above. The CSR version of the portfolio planner is accessible via the company intranet versus the Internet. Another difference in the versions is that the CSR fills out the questionnaire for the customer with the customer's assistance. The CSR takes the customer through a series of screens that the customer cannot see related to, but not limited to financial information, financial objectives, and investment assets where the customer is asked a series of questions, i.e. what is the customer's investing goal, taxable income, and whether he is making tax-advantaged or taxable investments. Depending upon whether the customer is making tax-advantaged or taxable investments, the portfolio planner recommendations will vary.

Figure 3:
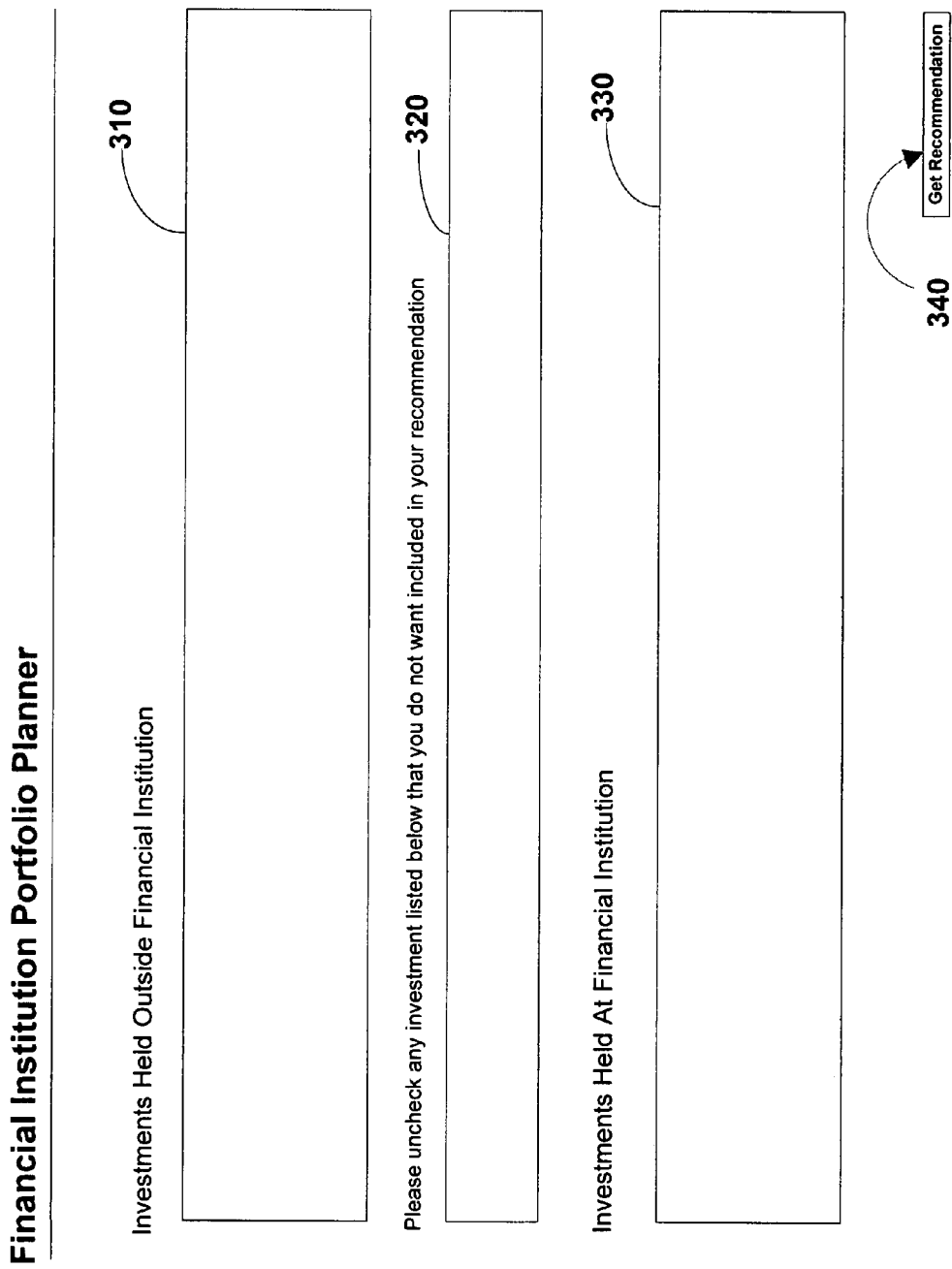
FIG. 3 is a graphical representation of the screen where the planner pre-fills asset information held at the financial institution providing the recommendation and where the customer enters information about assets held at other financial institutions.

The CSR will enter the customer's external asset information and review the information with the customer to ensure that it has been entered correctly. Like the customer on-line version, the assets are broken down into investments held outside the financial institution providing the recommendation 310 and into investments held by the financial institution 330 as shown in FIG. 3. The planner automatically displays the investments held at the financial institution. However, the CSR can uncheck any investment listed that the customer does not want included in his recommendation 320. In the section for investments held outside the financial institution, the CSR will be provided with a list of categories of investments that the customer may own. The CSR is prompted to enter additional details about each type of investment based on the category of investment entered (account type, investment type, a description of the asset or asset detail, the asset class and market value). The CSR verifies all of the information that he entered or that was pre-filled by the planner before it is submitted for the recommendation. If any of the information is incorrect, the CSR may change or edit the information before he submits it for the recommendation. Once all of the information has been verified, the CSR may submit the information by pressing the "Get Recommendation" button 340.

Figure 5:
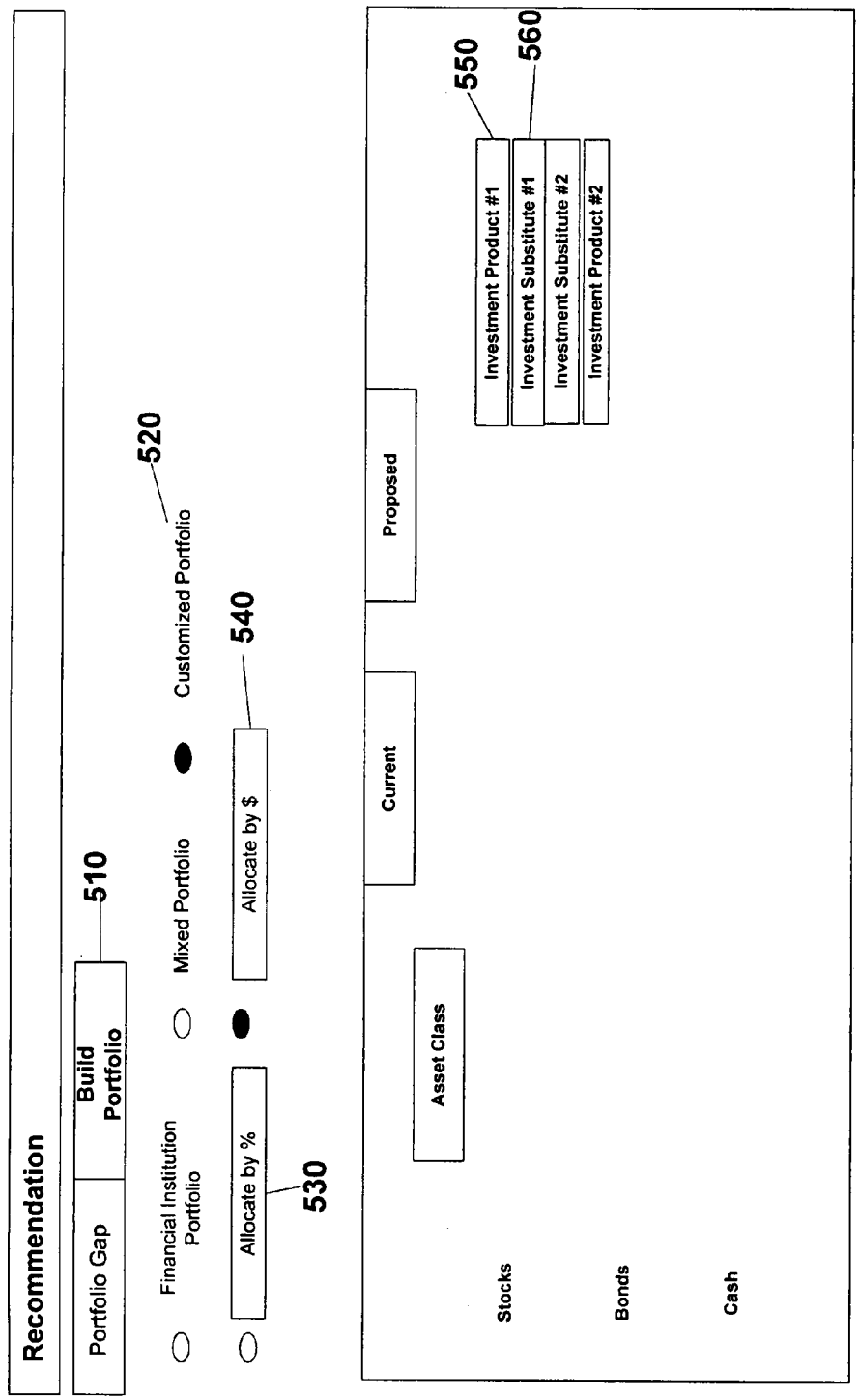
FIG. 5 is a graphical representation of the customer service representative's screen view of the recommendation plan.

Immediately after the "Get Recommendation" button is pressed, the customer's financial planning recommendation is provided and the customer and the CSR may now review the same web page simultaneously in real-time. FIG. 5 shows the screen view of the recommendation as observed by the CSR if the CSR plans to customize the recommendation for the customer. The CSR is allowed to change the portfolio by selecting the build portfolio option 510, then the customized portfolio option 520 along with either the allocate by percent (%) 530 or allocate by dollar amount ($) 540 option. To explain, this illustrative embodiment provides the CSR with substitute or alternative products in each class 550, 560 that are substitutable for the products denoted in the proposed allocations of the recommendation. There is also an approved percent allocation for each asset class (not shown). Additionally, for each product in each asset class, there is an approved percent allocation range (not shown) within which the CSR can invest the customer's assets.

Figure 6:
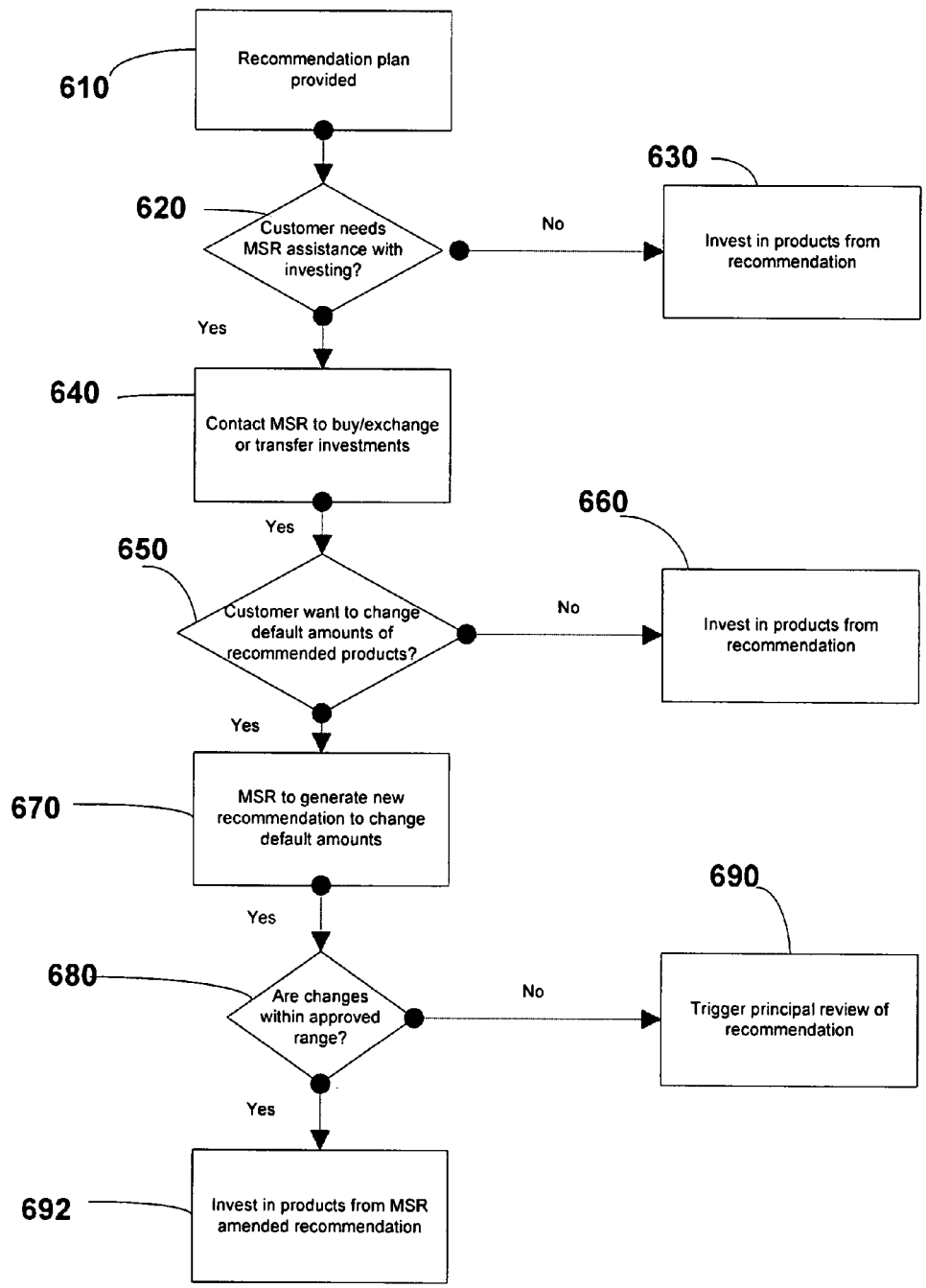
FIG. 6 is a block diagram providing an overview of a CSR changes to default amounts in a recommendation.

FIG. 6 further elaborates on the CSR changing default amounts in the recommendation. The customer is provided with a recommendation 610. For those customers who accept the recommendation provided, they can invest in the products that have been recommended 630. However, if a customer has questions or does not feel comfortable with investing without assistance, they may contact a CSR for help 620. The CSR will walk the customer through the recommendation to answer the customer's questions and to provide information on the products recommended as well as to provide information on product substitutes 640. If the CSR can answer all questions to the customer's satisfaction and the customer decides to use the recommendation as initially presented, thereby meaning the answer to block 650 is "no", then the customer may invest in the individual products 660. If the customer desires to change the default amount of products that have been recommended, the CSR will be able to generate a new recommendation in order to change the default amounts 670. As long as the CSR selects a default amount for a product that is within the approved range 680 the changes will be accepted by the system and the revised recommendation will be visible to the customer. The customer can then invest in the products 692. However, if the default percentage for a product selected by the CSR is outside of the approved range for that particular product, the choices will not be finalized, the customer will not be able to view the changes because they are not finalized and the entire recommendation will be reviewed by a principal or an individual of authority within the financial institution 690.

As long as the recommendation is not sent to a principal for review, the customer may take action on the recommendation by buying, selling or exchanging recommended funds located at the current financial institution using an existing mutual fund account located at the financial institution providing the recommendation, or an existing brokerage account located at the financial institution providing the recommendation. Alternatively, he may initiate a transfer of investments from another financial institution to an account housed at the financial institution providing the recommendation. More commonly, the CSR may proceed with buying or exchanging the respective stock for the customer.

Figure 7:
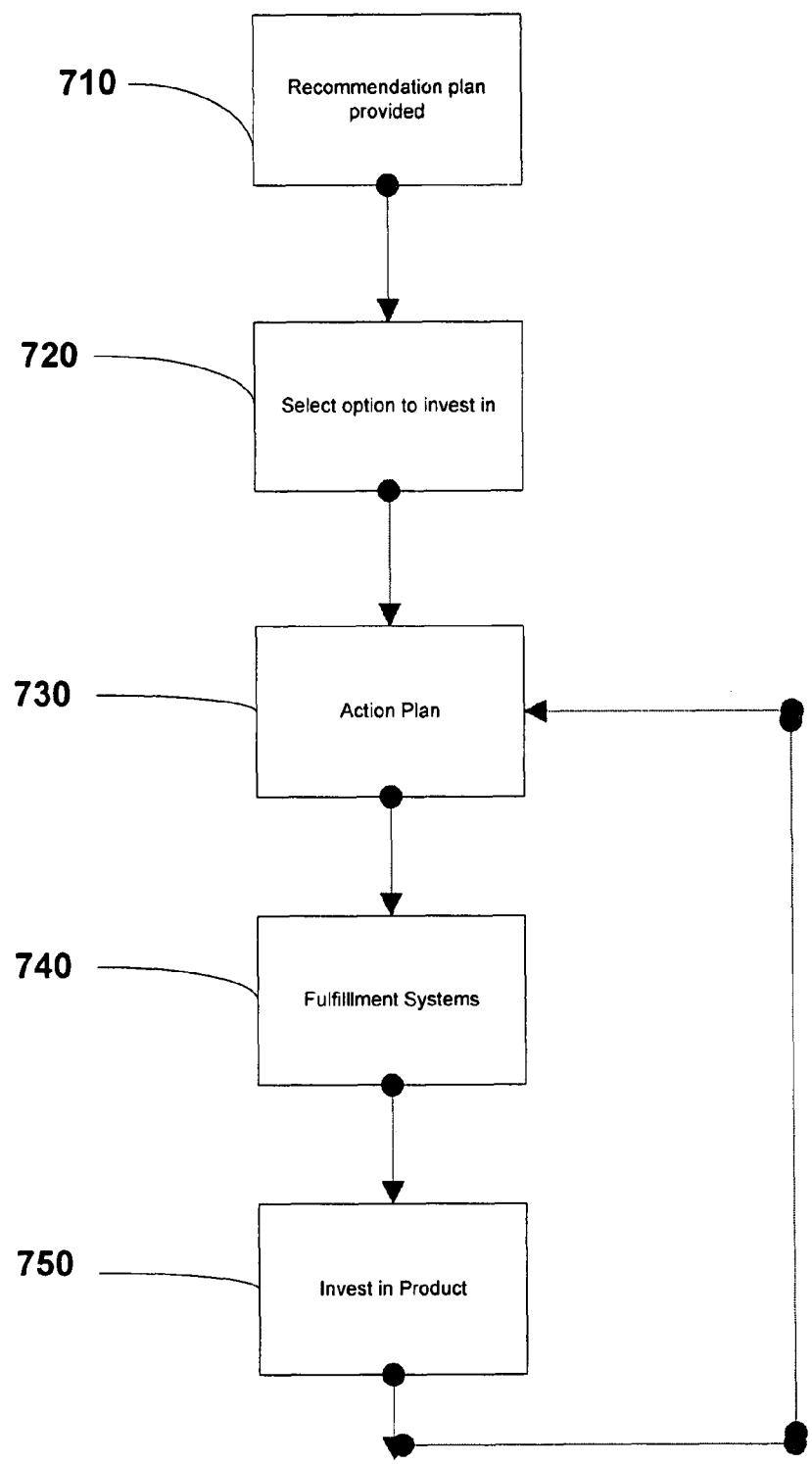
FIG. 7 is a block diagram of the process by which information is filtered from the recommendation plan into the respective product fulfillment system.

FIG. 7 shows one embodiment of the process by which information is filtered from the recommendation plan into the respective product fulfillment system. After the recommendation is provided 710, the customer is allowed to select an investment option 720, and then the action plan 730 is built. The customer clicks on the smart link for the product in which he wants to invest that opens up the product's fulfillment system 740 and pre-fills the product data from the recommendation into the on-line new account system. The customer can then invest in the product 750 with the click of a button. After the investment transaction is complete, the customer may return to the action plan so that he may invest in another product.

As mentioned earlier in this description, the customer is allowed to select a recommendation that is either tax-advantaged/tax deferred (i.e., IRA, Roth IRA, IRA rollover, SEP-IRA, etc.) or taxable (non-retirement). If the customer chooses to get a recommendation that is tax-advantaged in order to minimize his tax risk or the amount of taxes owed, he will continue to fill out the questionnaire as described above. During the questionnaire process, different triggers will pop up informing the customer of maximum contributions according to current tax laws. This embodiment is different from the embodiments described above because once the recommendation is provided the customer is not able to choose an investment option. In other words, the recommendation will look like that shown in FIG. 4 except that buttons "Invest in Option 1" 416 and "Invest in Option 2" 450 will not appear. Instead, the customer will be prompted to contact a customer service representative for assistance in making changes to his assets corresponding to the proposed allocations provided by the recommendation.

Figure 8A:
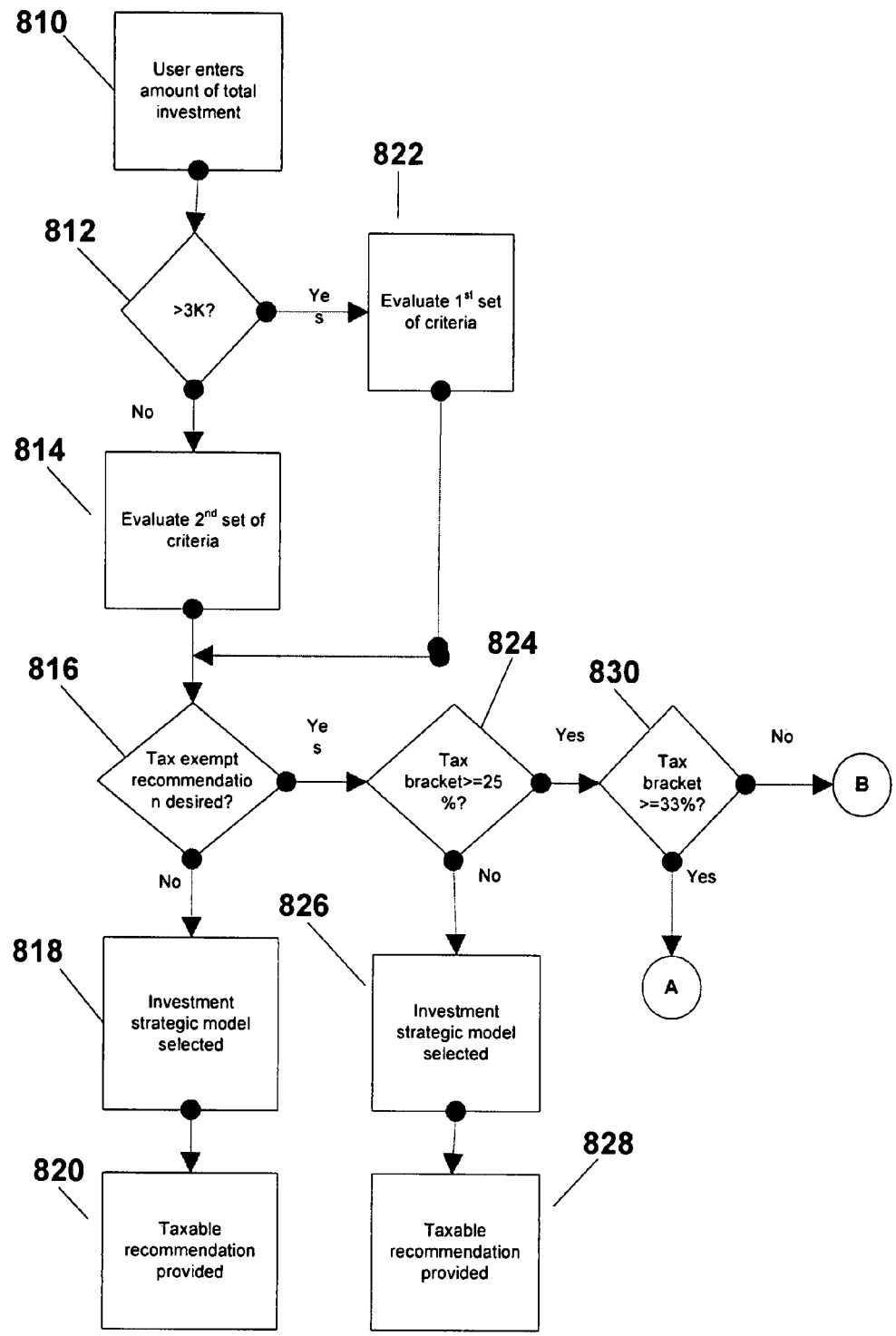
FIGS. 8A-8C are block diagrams representing the logic behind the recommendation.
Figure 8B:
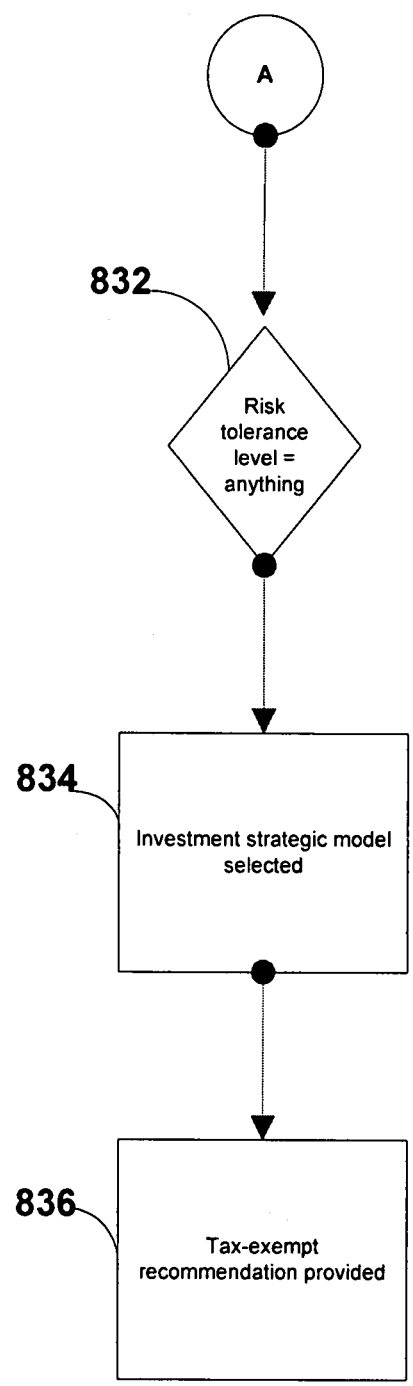
Figure 8C:
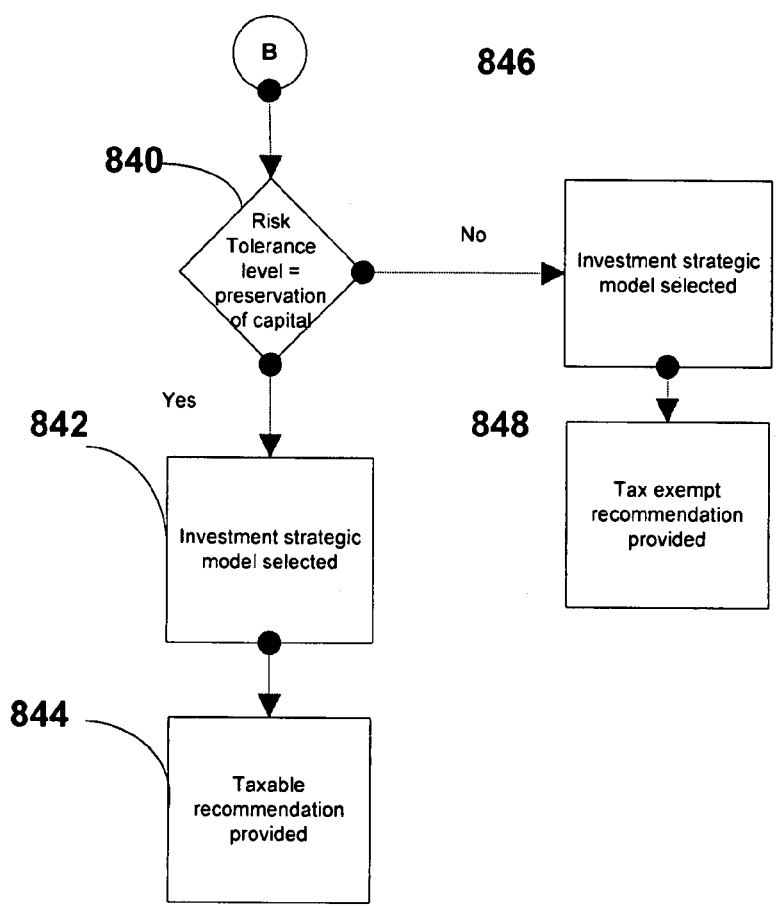
Figure 9A:
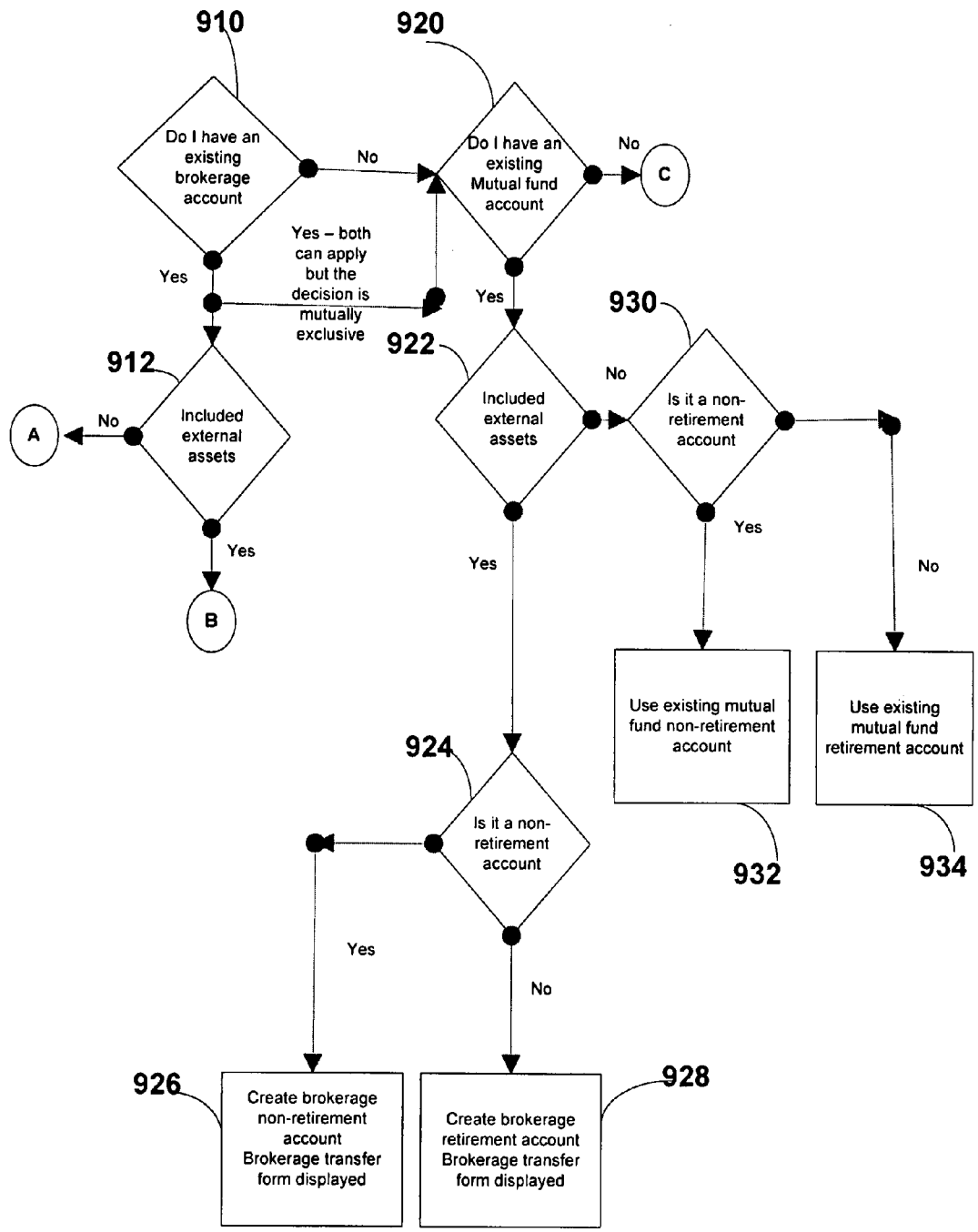
FIG. 9A-9D are block diagrams representing the logic behind the action plan.
Figure 9B:
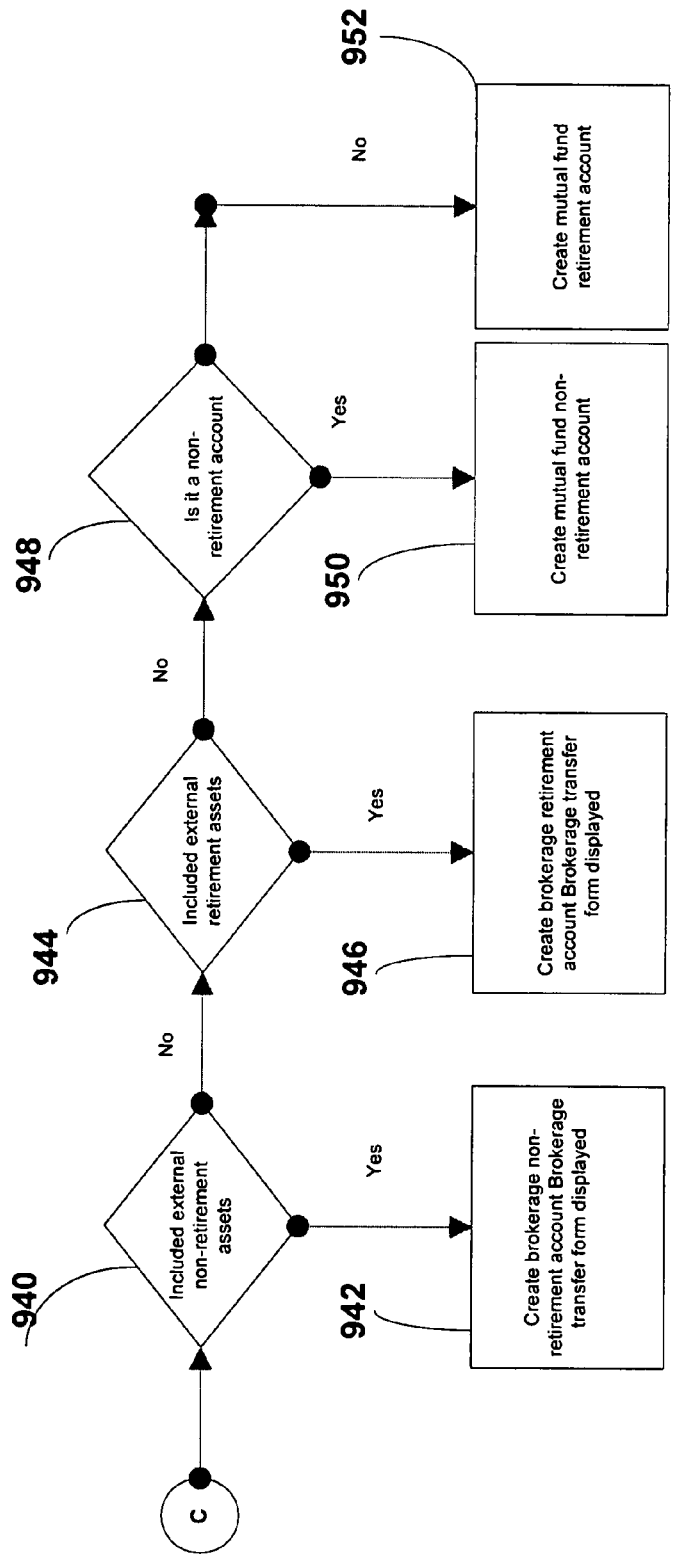
Figure 9C:
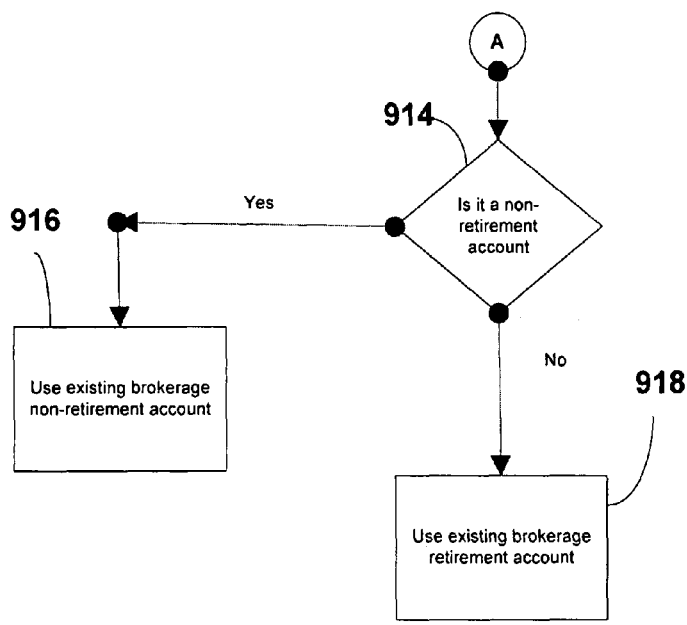
Figure 9D:
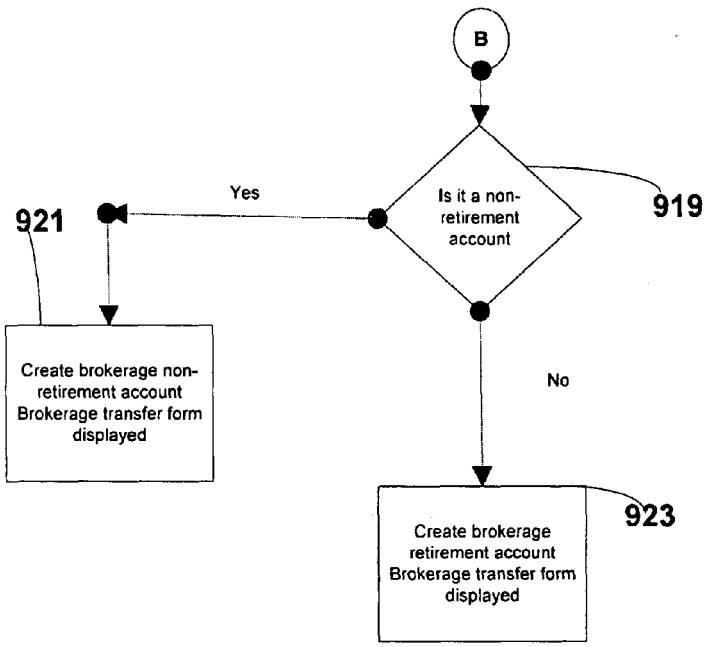

In order to generate the recommendation plan, a particular logic should be followed as shown in FIGS. 8A-8C. Beginning with FIG. 8A, the system first looks at the total investment amount entered by the customer 810. The total investment amount narrows down the number of investment strategic models that are applicable to the customer's recommendation. If a customer has a total investment less than a predetermined amount 812, for example three thousand dollars ($3000), the system evaluates a second set of criteria 814 including, but not limited to, the following elements to recommend products for investment: type of investment, total investment amount, systematic investment amount, risk tolerance and the state where the customer resides. However, if the customer has a total investment greater than a predetermined amount 812, i.e. three thousand dollars ($3000), the system will evaluate a first set of criteria 822 including, but not limited to, the following elements to recommend products for investment: type of investment, total investment amount, risk tolerance, tax bracket, and the state where the customer resides. Then the system considers whether a tax exempt recommendation is applicable 816 based on whether the customer wants a taxable recommendation or a tax-exempt (tax-advantaged) recommendation which minimizes tax risk. If a tax-exempt recommendation is not applicable the appropriate investment strategic model will be selected 818 based upon the information gathered and a taxable recommendation will be provided 820.

If a tax-exempt recommendation is applicable 816, next the customer's tax bracket will be considered. If the customer's tax bracket is greater than or equal to a first predetermined level 824, i.e. twenty-five percent (25%), but less than a second predetermined level 830, i.e. thirty-three (33%) percent, the applicable investment strategic model will be selected and a taxable recommendation will be provided 828. FIG. 8B illustrates the scenario where the customer's tax bracket is greater than the first predetermined level 824, i.e. twenty-five percent (25%), and also greater than or equal to a second pre-determined level 90, i.e. thirty-three percent (33%), no matter the customer's risk tolerance level 832, a investment strategic model will be selected 834 based on the applicable criteria and a tax-exempt recommendation will be provided 836.

Returning to FIG. 8A, if the customer desires a tax-exempt recommendation 816 and his tax bracket is greater than or equal to a first predetermined amount, i.e. twenty-five percent (25%), but less than a second predetermined amount, i.e. thirty-three percent (33%), then FIG. 8C applies. If the risk tolerance level is equal to the preservation of capital, then an investment strategic model will be selected 842 and a taxable recommendation will be provided 844. If the customer's risk tolerance level is not equal to the preservation of capital, an investment strategic model will be selected 846 and a tax-exempt recommendation will be provided 848.

Like the recommendation plan, there is logic behind the action plan as shown in FIG. 9. Depending on the customer's investments, the action plan will provide the customer with different options. If the customer is a new investor with an initial investment and therefore has no existing brokerage account 910 and no mutual fund 920 with the financial institution providing the recommendation, it would then be determined if the customer provided external non-retirement assets when entering his assets information 940. If no external non-retirement asset information was provided, it would be determined whether the customer included external retirement assets 944. If not, then is the account or the account type (i.e. non-IRA, IRA) to be opened a retirement account? If the answer is yes, a mutual fund non-retirement account would be created 950. If the answer is no, a mutual fund retirement account would be created 952.

In a second embodiment, the customer provided a single account type to be considered for the recommendation and has no account with the financial institution providing the recommendation, i.e. no existing brokerage account 910 and no mutual fund 920 with the financial institution providing the recommendation, it would then be determined whether the customer provided external non-retirement assets when entering his assets information 940. If no external non-retirement asset information was provided, it would be determined whether the customer included external retirement assets 944. If not, then a determination is made as to whether the account or account type to be opened a non-retirement account. If the answer is yes, a mutual fund non-retirement account would be created 950. If the answer is no, a mutual fund retirement account would be created 952. If the customer provided external non-retirement assets 940, then a brokerage non-retirement account would be created and a brokerage transfer for may be displayed 942. Alternatively, if the customer did not provide external non-retirement assets 940, but instead provided external retirement assets 944, then a brokerage retirement account would be created and a brokerage transfer form may be displayed. After the funds are transferred, then the customer may use them to purchase a new brokerage account or other assets (not shown).

Where the member provided a single account type to be considered for the recommendation and has only a brokerage account with financial institution providing the recommendation 910. The customer may buy a mutual fund using funds from a brokerage account with the financial institution providing the recommendation in the following ways. The customer wants to purchase a mutual fund as has been recommended. He does not have a mutual fund with the financial institution providing the recommendation 920, so it is next determined whether the customer provided external non-retirement assets 940 when entering his assets into the instant invention. If no external non-retirement asset information was provided, it would be determined whether the customer included external retirement assets 944. If not, then a determination is made as to whether the existing brokerage account with the financial institution providing the recommendation a non-retirement account 948. If the answer is yes, a mutual fund non-retirement account would be created 950. If the answer is no, a mutual fund retirement account would be created 952. In addition to buying mutual funds with the brokerage account, the customer may also purchase another brokerage account using an existing brokerage account with the financial institution providing the recommendation or the customer may purchase a brokerage account by transferring funds from another financial institution. To explain, if the customer has an existing brokerage account with the financial institution providing the recommendation 910, then it will be determined if he provided external assets when entering his asset information 912. If the customer had no external assets, then it would be determined whether the customer has a non-retirement account 914. If the customer has a non-retirement account, then the customer would use the existing brokerage non-retirement account to purchase a new brokerage account 916. If the customer has a retirement account, then an existing brokerage retirement account will be used to purchase a new brokerage account 918 or other assets.

Alternatively, if the customer included external assets when entering asset information into the instant invention, it will be determined whether the brokerage account is a non-retirement account 919. If the external asset is a non-retirement account, then a brokerage non-retirement account will be created and a brokerage transfer form will be displayed 921. However, if the external asset is not a retirement account, then a brokerage retirement account will be created and a brokerage transfer form will be displayed 923. The customer may fill out the brokerage transfer form and send it to the applicable financial institution so that the funds may be transferred. After the funds are transferred, then the customer may use them to purchase a new brokerage account or other assets (not shown).

In one embodiment, the customer provided a single type of account for the recommendation, but only has a mutual fund with the financial institution providing the recommendation. The customer does not have an existing brokerage account with the financial institution providing the recommendation 910, but does have a mutual fund 920. If the customer provided external assets when entering his asset information 922, then whether the external assets are a non-retirement account will be considered 924. If the external asset is a non-retirement account, then a brokerage non-retirement account will be created and a brokerage transfer form will be displayed 926. If the external asset is a retirement account, then a brokerage retirement account will be created and a brokerage transfer form will be displayed 928. Once these brokerage assets have been transferred, they may be used to purchase new brokerage accounts or other financial assets. If the customer included no external assets when entering his asset information, then it will be determined whether his existing mutual fund is a non-retirement account 930. If it is, then the existing mutual fund non-retirement account will be used to purchase additional mutual funds with the financial institution providing the recommendation 932. If the existing mutual fund is a retirement account, then the existing Mutual fund retirement account will be used to purchase additional mutual funds with the financial institution providing the recommendation 934.

In another embodiment, the customer has provided a single account type for the recommendation and has both a brokerage account and a mutual fund with the financial institution providing the recommendation. If the customer decides that he does not want to use his brokerage account 910 and also does not want to use his mutual fund 920, then it would then be determined if the customer provided external non-retirement assets when entering his assets information 940. If no external non-retirement asset information was provided, it would be determined whether the customer included external retirement assets 944. If not, a determination is made as to whether the existing mutual fund with financial institution providing the recommendation is a non-retirement account. If the answer is yes, a mutual fund non-retirement account would be created 950. If the answer is no, a mutual fund retirement account would be created 952. Another option in the embodiment is that the customer does not want to use his existing brokerage account with the financial institution providing the recommendation 910, but does have a mutual fund 920. If the customer provided external assets when entering his asset information 922, then whether the external assets are a non-retirement account will be considered 924. If the external asset is a non-retirement account, then a brokerage non-retirement account will be created and a brokerage transfer form will be displayed 926. If the external asset is a retirement account, then a brokerage retirement account will be created and a brokerage transfer form will be displayed 928. Once these brokerage assets have been transferred, they may be used to purchase new brokerage accounts or other financial assets. If the customer included no external assets when entering his asset information, then it will be determined whether his existing mutual fund is a non-retirement account 930. If it is, then the existing mutual fund non-retirement account will be used to purchase additional mutual funds with the financial institution providing the recommendation 932. If the existing mutual fund is a retirement account, then the existing mutual fund retirement account will be used to purchase additional mutual funds with the financial institution providing the recommendation 934.

In this embodiment, the customer has an additional option. To explain, if the customer has an existing brokerage account with the financial institution providing the recommendation 910, then it will be determined if he provided external assets when entering his asset information 912. If the customer had no external assets, then it would be determined whether the customer has a non-retirement account 914. If the customer has a non-retirement account, then the customer would use the existing brokerage non-retirement account to purchase a new brokerage account 916. If the customer has a retirement account, then an existing brokerage retirement account will be used to purchase a new brokerage account 918 or other assets. Alternatively, if the customer included external assets when entering asset information into the instant invention, it will be determined whether the brokerage account is a non-retirement account 919. If the external asset is a non-retirement account, then a brokerage non-retirement account will be created and a brokerage transfer form will be displayed 921. However, if the external asset is not a retirement account, then a brokerage retirement account will be created and a brokerage transfer form will be displayed 923. The customer may fill out the brokerage transfer form and send it to the applicable financial institution so that the funds may be transferred. After the funds are transferred, the customer may use them to purchase a new brokerage account or other assets (not shown).

Throughout this evaluation process, the system will retain its current on-line new account pre-fill functionality when a customer opens a new mutual fund account with the financial institution providing the recommendation. Specifically, if the customer receives a taxable recommendation, the system will pre-fill funds and amounts into recommended non-retirement accounts. If the customer receives a tax-exempt recommendation, the system will pre-fill only funds into recommended retirement accounts.

Description of Exemplary Computing and Network Environments

Figure 10:
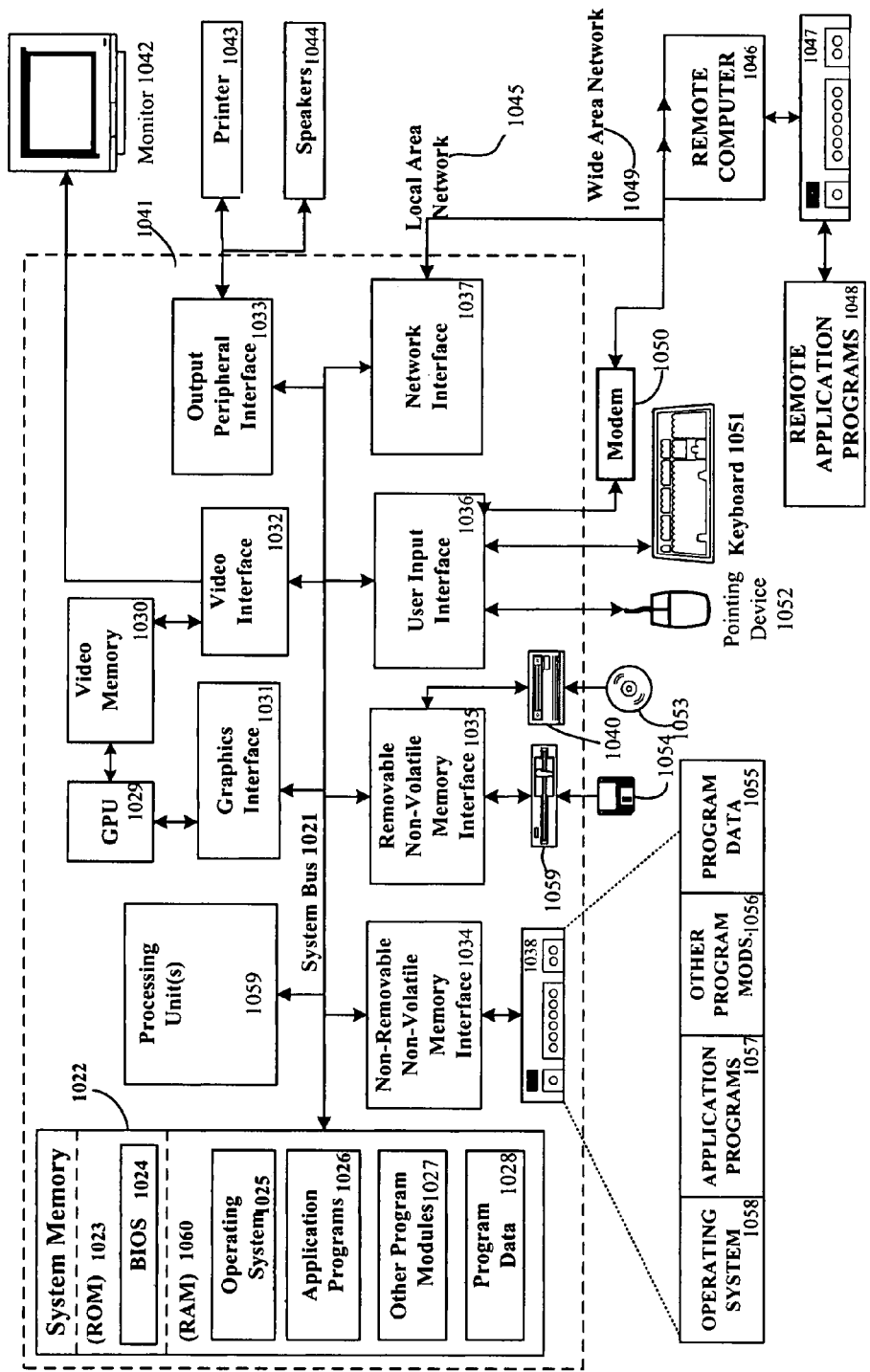
FIG. 10 is a block diagram representing an exemplary computing device environment in which the illustrative embodiments may be employed.

Referring to FIG. 10, shown is a block diagram representing an exemplary computing device suitable for use in conjunction with implementing the systems and methods described above. For example, the computer executable instructions that carry out the processes and methods described herein may reside and/or be executed in such a computing environment as shown in FIG. 10. The computing system environment 1020 is only one example of a suitable computing environment and is not intended to suggest any limitation as to the scope of use or functionality of the presently disclosed subject matter. Neither should the computing environment 1020 be interpreted as having any dependency or requirement relating to any one or combination of components illustrated in the exemplary operating environment 1020.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable customer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that performs particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 1041. Components of computer 1041 may include, but are not limited to, a processing unit 1059, a system memory 1022, and a system bus 1021 that couples various system components including the system memory to the processing unit 1059. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1041 typically includes a variety of computer readable media. Computer readable media can be any available media that can be accessed by computer 1041 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1041. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1022 includes computer storage media in the form of volatile and/or nonvolatile memory such as read only memory (ROM) 1023 and random access memory (RAM) 1060. A basic input/output system 1024 (BIOS), containing the basic routines that help to transfer information between elements within computer 1041, such as during start-up, is typically stored in ROM 1023. RAM 1060 typically contains data and/or program modules that are immediately accessible to and/or presently being operated on by processing unit 1059. By way of example, and not limitation, FIG. 10 illustrates operating system 1025, application programs 1026, other program modules 1027, and program data 1028.

The computer 1041 may also include other removable/non-removable, volatile/nonvolatile computer storage media. By way of example only, FIG. 10 illustrates a hard disk drive 1038 that reads from or writes to non-removable, nonvolatile magnetic media, a magnetic disk drive 1039 that reads from or writes to a removable, nonvolatile magnetic disk 1054, and an optical disk drive 1040 that reads from or writes to a removable, nonvolatile optical disk 1053 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1038 is typically connected to the system bus 1021 through a non-removable memory interface such as interface 1034, and magnetic disk drive 1039 and optical disk drive 1040 are typically connected to the system bus 1021 by a removable memory interface, such as interface 1035.

The drives and their associated computer storage media discussed above and illustrated in FIG. 10, provide storage of computer readable instructions, data structures, program modules and other data for the computer 1041. In FIG. 10, for example, hard disk drive 1038 is illustrated as storing operating system 1058, application programs 1057, other program modules 1056, and program data 1055. Note that these components can either be the same as or different from operating system 1025, application programs 1026, other program modules 1027, and program data 1028. Operating system 1058, application programs 1057, other program modules 1056, and program data 1055 are given different numbers here to illustrate that, at a minimum, they are different copies. A user may enter commands and information into the computer 1041 through input devices such as a keyboard 1051 and pointing device 1052, commonly referred to as a mouse, trackball or touch pad. Other input devices (not shown) may include a microphone, joystick, game pad, satellite dish, scanner, or the like. These and other input devices are often connected to the processing unit 1059 through a user input interface 1036 that is coupled to the system bus, but may be connected by other interface and bus structures, such as a parallel port, game port or a universal serial bus (USB). A monitor 1042 or other type of display device is also connected to the system bus 1021 via an interface, such as a video interface 1032. In addition to the monitor, computers may also include other peripheral output devices such as speakers 1044 and printer 1043, which may be connected through an output peripheral interface 1033.

The computer 1041 may operate in a networked environment using logical connections to one or more remote computers, such as a remote computer 1046. The remote computer 1046 may be a personal computer, a server, a router, a network PC, a peer device or other common network node, and typically includes many or all of the elements described above relative to the computer 1041, although only a memory storage device 1047 has been illustrated in FIG. 10. The logical connections depicted in FIG. 10 include a local area network (LAN) 1045 and a wide area network (WAN) 1049, but may also include other networks. Such networking environments are commonplace in offices, enterprise-wide computer networks, intranets and the Internet.

When used in a LAN networking environment, the computer 1041 is connected to the LAN 1045 through a network interface or adapter 1037. When used in a WAN networking environment, the computer 1041 typically includes a modem 1050 or other means for establishing communications over the WAN 1049, such as the Internet. The modem 1050, which may be internal or external, may be connected to the system bus 1021 via the user input interface 1036, or other appropriate mechanism. In a networked environment, program modules depicted relative to the computer 1041, or portions thereof, may be stored in the remote memory storage device. By way of example, and not limitation, FIG. 10 illustrates remote application programs 1048 as residing on memory device 1047. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, handheld devices, supercomputers, or computers integrated into other systems.

In light of the diverse computing environments that may be built according to the general framework provided in FIG. 10, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 11:
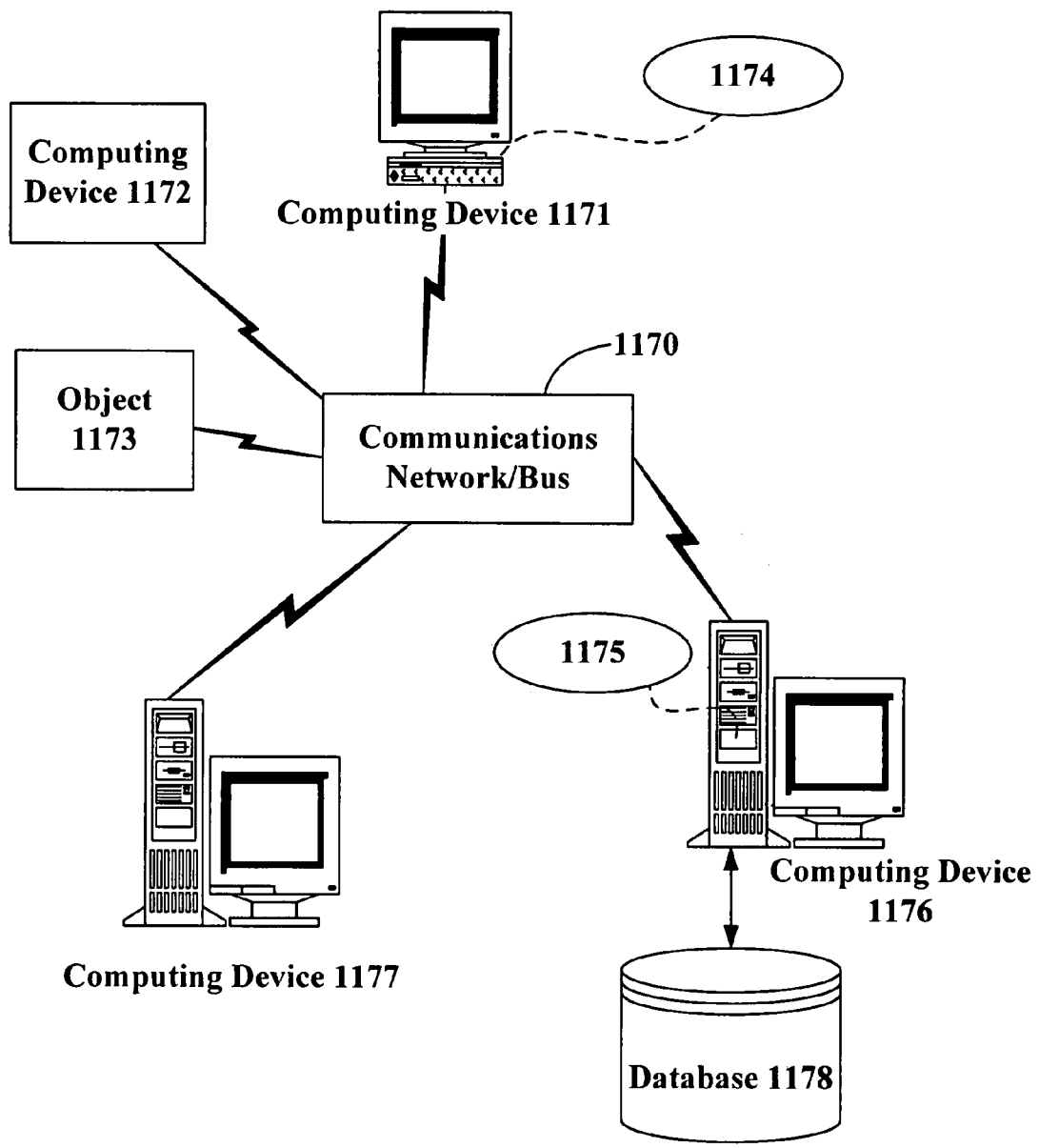
FIG. 11 is a block diagram representing an example networked computing environment in which the illustrative embodiments may be employed.

Referring next to FIG. 11, shown is an exemplary networked computing environment in which many computerized processes may be implemented to perform the processes described above. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 11 provides a schematic diagram of an exemplary networked or distributed computing environment. The environment comprises computing devices 1171, 1172, 1176, and 1177 as well as objects 1173, 1174, and 1175, and database 1178. Each of these entities 1171, 1172, 1173, 1174, 1175, 1176, 1177, and 1178 may comprise or make use of programs, methods, data stores, programmable logic, etc. The entities 1171, 1172, 1173, 1174, 1175, 1176, 1177, and 1178 may span portions of the same or different devices such as PDAs, audio/video devices, MP3 players, personal computers, etc. Each entity 1171, 1172, 1173, 1174, 1175, 1176, 1177, and 1178 can communicate with another entity 1171, 1172, 1173, 1174, 1175, 1176, 1177, and 1178 by way of the communications network 1170. In this regard, any entity may be responsible for the maintenance and updating of a database 1178 or other storage element.

This network 1170 may itself comprise other computing entities that provide services to the system of FIG. 11, and may itself represent multiple interconnected networks. In accordance with an aspect of the presently disclosed subject matter, each entity 1171, 1172, 1173, 1174, 1175, 1176, 1177, and 1178 may contain discrete functional program modules that might make use of an API, or other object, software, firmware and/or hardware, to request services of one or more of the other entities 1171, 1172, 1173, 1174, 1175, 1176, 1177, and 1178.

It can also be appreciated that an object, such as 1175, may be hosted on another computing device 1176. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 11, any entity 1171, 1172, 1173, 1174, 1175, 1176, 1177, and 1178 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 11 and the further diversification that can occur in computing in a network environment such as that of FIG. 11, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

As mentioned above, while exemplary embodiments of the invention have been described in connection with various computing devices, the underlying concepts may be applied to any computing device or system. Thus, the methods and systems of the present invention may be applied to a variety of applications and devices. While exemplary names and examples are chosen herein as representative of various choices, these names and examples are not intended to be limiting. One of ordinary skill in the art will appreciate that there are numerous ways of providing hardware and software implementations that achieves the same, similar or equivalent systems and methods achieved by the invention.

As is apparent from the above, all or portions of the various systems, methods, and aspects of the present invention may be embodied in hardware, software, or a combination of both.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A computer-implemented method for implementing an action plan for a customer investing in financial investment products, the method comprising:
    receiving, by a computer system via a network, a request from the customer for portfolio planning;
    receiving, by the computer system via the network, an investment selection of the customer, wherein the investment selection comprises:
        an initial investment; and
        an account type for a recommendation, wherein:
            the account type specifies a retirement account or a non-retirement account;
    transmitting, from the computer system to a computer device associated with the customer, an interface, wherein;
        the interface is configured to request customer input whether to perform a portfolio recommendation;
    receiving, at the computer system, an indication from the customer to perform the portfolio recommendation;
    in response to receiving the indication from the customer to perform the portfolio recommendation, using the computer system in order to generate a portfolio recommendation tool;
    transmitting, from the computer system via the network, the portfolio recommendation tool that concurrently presents an in-house recommended portfolio and a mixed recommended portfolio, wherein:
        the recommended portfolio comprises mutual funds only housed with the financial institution providing the recommendation,
        the recommended portfolio comprises product-level recommendations within a plurality of asset classes, wherein each of the product-level recommendations are housed with the financial institution providing the recommendation,
        the mixed recommended portfolio comprises at least one mutual fund housed by another financial institution,
        the mixed recommended portfolio comprises product-level recommendations within the plurality of asset classes, wherein at least one of the product-level recommendations are housed by another financial institution and at least one of the product-level recommendations are housed by the financial institution providing the recommendation, and
        the portfolio recommendation tool provides a first option to select the in-house recommended portfolio and a second option to select the mixed recommended portfolio;
    instantiating an on-line account application pre-fill component;
    pre-filling, by the computer system, fund account information and amount information in a mutual fund account application form provided by the on-line account application pre-fill component, wherein:
        the fund account information details one or more assets to be used to fund purchase of the at least one mutual fund product recommendation from the mixed recommended portfolio or in-house recommended portfolio.

2. The method of claim 1, wherein providing the set of investment options comprises:
    creating a new mutual fund non-retirement account when the customer provides no external asset information, and the account type is the non-retirement account; and
    creating a new mutual fund retirement account when the customer provides no external asset information and the account type is the retirement account.

3. The method of claim 2, wherein providing the set of investment options further comprises:
    creating a new brokerage non-retirement account and displaying a brokerage transfer form when the customer provided external non-retirement asset information; and
    creating a new brokerage retirement account and displaying a brokerage transfer form when the customer provided external retirement assets information.

4. The method of claim 1, wherein providing the set of investment options comprises:
    creating a brokerage non-retirement account and displaying a brokerage transfer form when the customer provided external non-retirement asset information;
    creating a brokerage retirement account and displaying a brokerage transfer form when the customer provided external retirement asset information;
    indicating that the brokerage non-retirement account with the financial institution providing the recommendation be used to purchase the mutual fund when the customer provides no external asset information and the account type is the non-retirement account;
    indicating that the brokerage retirement account with the financial institution providing the recommendation be used to purchase the mutual fund when the customer provides no external asset information and the account type is the retirement account; and
    buying a mutual fund with funds from a brokerage account with the financial institution providing the recommendation based on at least one of the following:
        creating a mutual fund non-retirement account when the customer provides no external asset information and the account type is the non-retirement account; and
        creating a mutual fund retirement account when the customer provides no external asset information and account type is the non-retirement account.

5. The method of claim 1, wherein providing the set of investment options comprises:
    buying a mutual fund using a non-retirement mutual fund account with the financial institution providing the recommendation when the customer provided external non-retirement asset information;
    buying a mutual fund using a retirement mutual fund account with the financial institution providing the recommendation when the customer provided external retirement asset information;

creating a brokerage non-retirement account and displaying a brokerage transfer form when the customer provided external non-retirement asset information; and creating a brokerage retirement account and displaying a brokerage transfer form when the customer provided external retirement asset information.

6. The method of claim 1, wherein providing the set of investment options comprises:

buying a mutual fund using a non-retirement mutual fund account held by the financial institution providing the recommendation when the customer provided external non-retirement asset information;

buying a mutual fund using a retirement mutual fund account held by the financial institution providing the recommendation when the customer provided external retirement asset information;

creating a brokerage non-retirement account and displaying a brokerage transfer form when the customer provided external non-retirement asset information; and creating a brokerage retirement account and displaying the brokerage transfer form when the customer provided external retirement asset information;

indicating that the brokerage non-retirement account with the financial institution providing the recommendation be used to purchase the mutual fund when the customer provides no external asset information and the account type is the non-retirement account;

indicating that the brokerage retirement account with the financial institution providing the recommendation be used to purchase the mutual fund when the customer provides no external asset information and the account type is the retirement account;

creating the brokerage non-retirement account and displaying the brokerage transfer form when the customer provided external non-retirement asset information;

creating the brokerage non-retirement account and displaying the brokerage transfer form when the customer provided external retirement asset information;

creating a new mutual fund non-retirement account when the customer provides no external asset information and the account type is the non-retirement account; and creating a new mutual fund retirement account when the customer provides no external asset information and the account type is the retirement account.

7. The method of claim 1, further comprising failing to create an action plan if based on at least one of:

a customer including more than one account type for the recommendation;

the customer including only non-retirement assets other than a bank money market account for the recommendation but choosing retirement assets as a type of account; and the customer including only retirement assets for the recommendation, but selecting the non-retirement account as a type of account.

8. A system for implementing an action plan, the system comprising:

a memory; and a processor disposed in communication with said memory, and configured to issue a plurality of processing instructions stored in the memory, wherein the processor issues instructions to:

receive, by a computer system via a network, a request from the customer for portfolio planning;

receive, by the computer system via the network an investment selection of the customer, wherein the investment selection comprises:

an initial investment; and an account type for a recommendation, wherein:

the account type specifies a retirement account or a non-retirement account;

transmit, from the computer system to a computer device associated with the customer, an interface, wherein;

the interface is configured to request customer input whether to perform a portfolio recommendation;

receive, at the computer system, an indication from the customer to perform the portfolio recommendation;

in response to receiving the indication from the customer to perform the portfolio recommendation, use the computer system in order to generate a portfolio recommendation tool;

transmit, from the computer system via the network, the portfolio recommendation tool that concurrently presents an in-house recommended portfolio and a mixed recommended portfolio, wherein:

the recommend portfolio comprises mutual funds only housed with the financial institution providing the recommendation, the recommended portfolio comprises product-level recommendations within a plurality of asset classes, wherein each of the product-level recommendations are housed with the financial institution providing the recommendation, the mixed recommended portfolio comprises at least one mutual fund housed by another financial institution, the mixed recommended portfolio comprises product-level recommendations within the plurality of asset classes, wherein at least one of the product-level recommendations are housed by another financial institution and at least one of the product-level recommendations are housed by the financial institution providing the recommendation, and the portfolio recommendation tool provides a first option to select the in-house recommended portfolio and a second option to select the mixed recommended portfolio;

instantiate an on-line account application pre-fill component;

pre-fill fund account information and amount information in a mutual fund account application form provided by the on-line account application pre-fill component, wherein:

the fund account information details one or more assets to be used to fund purchase of the at least one mutual fund product recommendation from the mixed recommended portfolio or in-house recommended portfolio.

9. The system of claim 8, wherein the processor further issues instructions to:

create a new mutual fund non-retirement account when the customer provides no external asset information; and the account type is the non-retirement account; and create a new mutual fund retirement account when the customer provides no external asset information, and the account type is the retirement account.

10. The system of claim 8, wherein the processor further issues instructions to:

create a new mutual fund non-retirement account when the customer provides no external asset information, and the account type is the non-retirement account;

create a new mutual fund retirement account when the customer provides no external asset information, and the account type is the retirement account;

create a new brokerage non-retirement account and display a brokerage transfer form when the customer provided external non-retirement asset information; and create a new brokerage retirement account and display a brokerage transfer form when the customer provided external retirement assets information.

11. The system of claim 8, wherein the processor further issues instructions to:

create a new brokerage non-retirement account and displaying a brokerage transfer form if the customer provided external non-retirement asset information;

create a new brokerage retirement account and displaying a brokerage transfer form when the customer provided external retirement asset information;

indicate that the brokerage non-retirement account with the financial institution providing the recommendation be used to purchase the mutual fund when the customer provides no external asset information and the account type is the non-retirement account;

indicate that the brokerage retirement account with the financial institution providing the recommendation be used to purchase the mutual fund when the customer provides no external asset information and the account type is the retirement account; and buy a mutual fund with funds from a brokerage account with the financial institution providing the recommendation based on at least one of the following:

create a new mutual fund non-retirement account if the customer provides no external asset information and the account type is the non-retirement account; and create a new mutual fund retirement account if the customer provides no external asset information and the account type is the non-retirement account.

12. The system of claim 8, wherein the processor further issues instructions to:

buy a mutual fund using a non-retirement mutual fund account with the financial institution providing the recommendation when the customer provided external non-retirement asset information;

buy a mutual fund using a retirement mutual fund account with the financial institution providing the recommendation when the customer provided external retirement asset information;

create a new brokerage non-retirement account and display a brokerage transfer form when the customer provided external non-retirement asset information; and create a new brokerage retirement account and display a brokerage transfer form when the customer provided external retirement asset information.

13. The system of claim 8, wherein the processor further issues instructions to:

buy a mutual fund using a non-retirement mutual fund account held by the financial institution providing the recommendation when the customer provided external non-retirement asset information;

buy a mutual fund using a retirement mutual fund account held by the financial institution providing the recommendation when the customer provided external retirement asset information;

create a new brokerage non-retirement account and display a brokerage transfer form when the customer provided external non-retirement asset information;

create a new brokerage retirement account and display the brokerage transfer form when the customer provided external retirement asset information;

indicate that the brokerage non-retirement account with the financial institution providing the recommendation be used to purchase the mutual fund when the customer provides no external asset information and the account type is the non-retirement account;

indicate that the brokerage retirement account with the financial institution providing the recommendation be used to purchase the mutual fund when the customer provides no external asset information and the account type is the retirement account;

create the brokerage non-retirement account and displaying the brokerage transfer form the customer provided external non-retirement asset information;

create the brokerage non-retirement account and displaying the brokerage transfer form when the customer provided external retirement asset information;

create a new mutual fund non-retirement account when the customer provides no external asset information and the account type is the non-retirement account; and create a new mutual fund retirement account when the customer provides no external asset information and the account type is the retirement account.

14. The system of claim 8, wherein the processor further issues instructions to fail to create an action plan based on at least one of:

a customer including more than one account type for the recommendation;

the customer including only non-retirement assets other than a bank money market account for the recommendation but choosing retirement assets as a type of account; and the customer including only retirement assets for the recommendation, but selecting a non-retirement account as a type of account.

15. A computer-readable non-transitory storage medium for implementing an action plan, the computer-readable non-transitory storage medium storing computer-executable instructions to:

receive, by a computer system via a network, a request from the customer for portfolio planning;

receive, by the computer system via the network, an investment selection of a customer, wherein the investment selection comprises:

an initial investment; and an account type for a recommendation, wherein:

the account type specifies a retirement account or a non-retirement account;

transmit, from the computer system to a computer device associated with the customer, an interface, wherein;

the interface is configured to request customer input whether to perform a portfolio recommendation;

receive, at the computer system, an indication from the customer to perform the portfolio recommendation;

in response to receiving the indication from the customer to perform the portfolio recommendation, using the computer system in order to generate a portfolio recommendation tool;

transmit, from the computer system via the network, a portfolio recommendation tool that concurrently presents an in-house recommended portfolio and a mixed recommended portfolio, wherein:

the recommended portfolio comprises mutual funds only housed with the financial institution providing the recommendation, the recommended portfolio comprises product-level recommendations within a plurality of asset classes, wherein each of the product-level recommendations are housed with the financial institution providing the recommendation, the mixed recommended portfolio comprises at least one mutual fund housed by another financial institution, the mixed recommended portfolio comprises product-level recommendations within the plurality of asset classes, wherein at least one of the product-level recommendations are housed by another financial institution and at least one of the product-level recommendations are housed by the financial institution providing the recommendation, and the portfolio recommendation tool provides a first option to select the in-house recommended portfolio and a second option to select the mixed recommended portfolio;

instantiate an on-line account application pre-fill component; and pre-fill fund account information and amount information in a mutual fund account application form provided by the on-line account application pre-fill component, wherein:

the fund account information details one or more assets to be used to fund purchase of the at least one mutual fund product recommendation from the mixed recommended portfolio or in-house recommended portfolio.

16. The computer-readable non-transitory storage medium of claim 15, wherein instructions to provide the set of investment options based on the customer including the initial investment further comprise computer-executable instructions to:

create a new mutual fund non-retirement account when the customer provides no external asset information, and the account type is the non-retirement account; and create a new mutual fund retirement account and the customer provides no external asset information, and the account type is the retirement account.

17. The computer-readable non-transitory storage medium of claim 15, wherein instructions to provide the set of investment further comprise computer-executable instructions to:

create a new mutual fund non-retirement account when the customer provides no external asset information, and the account type is the non-retirement account;

create a new mutual fund retirement account if the customer provides no external asset information, and the account type is the retirement account;

create a new brokerage non-retirement account and display a brokerage transfer form when the customer provided external non-retirement asset information; and create a new brokerage retirement account and display a brokerage transfer form when the customer provided external retirement assets information.

18. The computer-readable non-transitory storage medium of claim 15, wherein instructions to provide the set of investment options further comprise computer-executable instructions to:

create a brokerage non-retirement account and display a brokerage transfer form when the customer provided external non-retirement asset information;

create a brokerage retirement account and display a brokerage transfer form when the customer provided external retirement asset information;

indicate that the brokerage non-retirement account with the financial institution providing the recommendation be used to purchase the mutual fund when the customer provides no external asset information and the account type is the non-retirement account;

indicate that the brokerage retirement account with the financial institution providing the recommendation be used to purchase the mutual fund when the customer provides no external asset information and the account type is the retirement account; and buy a mutual fund with funds from a brokerage account with the financial institution providing the recommendation based on at least one of the following:

creating a mutual fund non-retirement account when the customer provides no external asset information and the account type is the non-retirement account; and creating a mutual fund retirement account when the customer provides no external asset information and the account type is the non-retirement account.

19. The computer-readable non-transitory storage medium of claim 15, wherein instructions to provide the set of investment options further comprise computer-executable instructions to:

buy a mutual fund using a non-retirement mutual fund account with the financial institution providing the recommendation when the customer provided external non-retirement asset information;

buy a mutual fund using a retirement mutual fund account with the financial institution providing the recommendation when the customer provided external retirement asset information;

create a brokerage non-retirement account and display a brokerage transfer form when the customer provided external non-retirement asset information; and create a brokerage retirement account and display a brokerage transfer form when the customer provided external retirement asset information.

20. The computer-readable non-transitory storage medium of claim 15, wherein instructions to provide the set of investment options further comprise computer-executable instructions to:

buy a mutual fund using a non-retirement mutual fund account held by the financial institution providing the recommendation when the customer provided external non-retirement asset information;

buy a mutual fund using a retirement mutual fund account held by the financial institution providing the recommendation when the customer provided external retirement asset information;

create a brokerage non-retirement account and display a brokerage transfer form when the customer provided external non-retirement asset information; and create a brokerage retirement account and display the brokerage transfer form when the customer provided external retirement asset information;

indicate that the brokerage non-retirement account with the financial institution providing the recommendation be used to purchase the mutual fund when the customer provides no external asset information and the account type is the non-retirement account;

indicate that the brokerage retirement account with the financial institution providing the recommendation be used to purchase the mutual fund when the customer provides no external asset information and the account type is the retirement account;

create the brokerage non-retirement account and display the brokerage transfer form when the customer provided external non-retirement asset information;

create the brokerage non-retirement account and display the brokerage transfer form when the customer provided external retirement asset information;

create a new mutual fund non-retirement account when the customer provides no external asset information and the single account type is the non-retirement account; and create a new mutual fund retirement account when the customer provides no external asset information and the single account type is the retirement account.

21. The computer-readable non-transitory storage medium of claim 15, further comprising instructions for failing to create an action plan if based on at least one of:

a customer including more than one account type for the recommendation;

the customer including only non-retirement assets other than a bank money market account for the recommendation but choosing retirement assets as a type of account; and the customer including only retirement assets for the recommendation, but selecting the non-retirement account as a type of account.

* * * * *